United States Patent
Edwards

(10) Patent No.: US 12,504,265 B2
(45) Date of Patent: Dec. 23, 2025

(54) SYSTEM AND METHOD OF MEASURING GAPS

(71) Applicant: FARO Technologies, Inc., Lake Mary, FL (US)

(72) Inventor: Michelle Edwards, Ormond, FL (US)

(73) Assignee: FARO Technologies, Inc., Lake Mary, FL (US)

( * ) Notice: Subject to any disclaimer, the term of this patent is extended or adjusted under 35 U.S.C. 154(b) by 401 days.

(21) Appl. No.: 18/328,864

(22) Filed: Jun. 5, 2023

(65) Prior Publication Data
US 2023/0392916 A1 Dec. 7, 2023

Related U.S. Application Data

(60) Provisional application No. 63/349,343, filed on Jun. 6, 2022.

(51) Int. Cl.
*G01B 5/012* (2006.01)

(52) U.S. Cl.
CPC .................. *G01B 5/012* (2013.01)

(58) Field of Classification Search
CPC ............. G01B 5/012; G01B 5/12; G01B 5/14
USPC .......................................... 33/503, 542, 551
See application file for complete search history.

(56) References Cited

U.S. PATENT DOCUMENTS

| | | | | |
|---|---|---|---|---|
| 3,869,799 A * | 3/1975 | Neuer | ...................... | B23Q 1/36 33/561 |
| 6,088,923 A * | 7/2000 | Guerin | .................... | G01B 5/201 33/542 |
| 6,178,389 B1 * | 1/2001 | Sola | ........................ | G01B 21/04 702/167 |
| 6,874,243 B2 * | 4/2005 | Hama | ...................... | G01B 5/28 33/551 |
| 7,363,721 B2 * | 4/2008 | Nappier | .................... | G01B 3/28 33/542 |
| 9,366,519 B2 * | 6/2016 | Danbury | ................. | G01B 5/008 |
| 9,528,824 B2 * | 12/2016 | Bos | ......................... | G01B 7/012 |
| 10,663,274 B2 * | 5/2020 | Creachbaum | .......... | G01B 5/008 |
| 11,644,299 B2 * | 5/2023 | Hamner | ............... | G01D 5/2053 33/503 |
| 11,859,969 B2 * | 1/2024 | Morii | ...................... | G01B 3/004 |
| 12,141,958 B2 * | 11/2024 | Naruse | ...................... | G06T 7/74 |
| 2025/0130203 A1 * | 4/2025 | Ould | ...................... | G01N 29/04 |

\* cited by examiner

*Primary Examiner* — George B Bennett
(74) *Attorney, Agent, or Firm* — McCarter & English, LLP

(57) ABSTRACT

A method for measuring gaps between material layers include inserting a probe tip within a through-hole defined in a structural component. The probe tip is arranged at the end of a probe assembly attached to articulated arm coordinate measuring machine (AACMM). The method further includes contacting the probe tip with a hole surface of the through-hole. The method further includes translating the probe tip along the hole surface in a direction parallel to an axis through the through-hole. The probe tip passes over a gap along the through-hole. The method further includes measuring a radial position of the probe tip during the translation along the hole surface and across the gap including a deflection of radial position of the probe tip as the probe tip crosses the gap. The method further includes calculating a gap size of the gap based on the deflection and a size of the probe tip.

18 Claims, 16 Drawing Sheets

SYSTEM AND METHOD OF MEASURING GAPS

CROSS-REFERENCE TO RELATED APPLICATIONS

This application claims the benefit of U.S. Provisional Patent Application No. 63/349,343, entitled "SYSTEM AND METHOD OF MEASURING GAPS" filed Jun. 6, 2022, which is incorporated by reference herein in its entirety.

BACKGROUND

The present disclosure relates to a coordinate measuring system, and, in particular, to coordinate measuring system including or cooperating with a portable articulated arm coordinate measuring machine (AACMM) and measuring gaps between components and surfaces.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3D) form on a computer screen. In other cases, the data are provided to the user in numeric form, for example when measuring the diameter of a hole, the text "Diameter=1.0034" is displayed on a computer screen.

However, it may be difficult to use such AACMMs and associated probes with very small holes due to the angles and access constraints involved. For example, through-holes are common in aerospace and other applications and rather than using an AACMM with a probe, manually employed feeler gauges are used. These through-holes may include an internal gap between two mating surfaces. The tolerance and inspection requirements for these gaps are very high to ensure compliance with part and application needs (e.g., on the order of 0.008 inches). Current methods for measuring such gaps is labor intensive, with each hole inspected by hand using a 90° feeler gauge at four locations about a circumference of a though-hole that is measured. Such manual measurement can result variations in measurement that are a result of human/operator error, is a time consuming process, and may not result in repeatable measurements.

Accordingly, while existing AACMM's are suitable for their intended purposes there remains a need for through-hole measurements where conventional probes cannot reach and where current solutions may suffer from various drawbacks, as described herein.

BRIEF DESCRIPTION

According to some embodiments of the present disclosure, methods for measuring gaps are provided. The methods include inserting a probe tip within a through-hole defined in a structural component, wherein the probe tip is arranged at the end of a probe assembly attached to articulated arm coordinate measuring machine (AACMM), contacting the probe tip with a hole surface of the through-hole, translating the probe tip along the hole surface in a direction parallel to an axis through the through-hole, wherein the probe tip passes over a gap along the through-hole, measuring a radial position of the probe tip during the translation along the hole surface and across the gap including a deflection of radial position of the probe tip as the probe tip crosses the gap, and calculating a gap size of the gap based on the deflection and a size of the probe tip.

In addition to one or more of the features described herein, or as an alternative, further embodiments of the methods may include that the structural component comprises a first material layer mated to a second material layer and the gap is defined between the first material layer and the second material layer.

In addition to one or more of the features described herein, or as an alternative, further embodiments of the methods may include that the through-hole is configured to receive a rivet to mechanically join the first material layer to the second material layer.

In addition to one or more of the features described herein, or as an alternative, further embodiments of the methods may include that the first material layer is formed of a material different from a material that forms the second material layer.

In addition to one or more of the features described herein, or as an alternative, further embodiments of the methods may include that the probe tip has a diameter of 10 mm or less.

In addition to one or more of the features described herein, or as an alternative, further embodiments of the methods may include that the probe tip has as diameter of 6 mm or less.

In addition to one or more of the features described herein, or as an alternative, further embodiments of the methods may include that the probe tip has a diameter of 2 mm or less.

In addition to one or more of the features described herein, or as an alternative, further embodiments of the methods may include that the through-hole has a diameter of 4 inches or less.

In addition to one or more of the features described herein, or as an alternative, further embodiments of the methods may include that the probe tip is a hard-probe tip.

In addition to one or more of the features described herein, or as an alternative, further embodiments of the methods may include that the gap size is calculated from a relationship:

$$r^2 = (r-d)^2 + \left(\frac{1}{2}g\right)^2,$$

where r is a radius of the probe tip, d is a maximum value of the measured deflection of the probe tip as it passes over the gap, and g is the gap size.

In addition to one or more of the features described herein, or as an alternative, further embodiments of the methods may include that the structural component is a part of a pressure bulkhead or a cargo door of aircraft or seacraft.

In addition to one or more of the features described herein, or as an alternative, further embodiments of the methods may include that the articulated arm coordinate measuring machine comprises a six-axis coordinate measuring machine.

In addition to one or more of the features described herein, or as an alternative, further embodiments of the methods may include that the articulated arm coordinate measuring machine comprises a seven-axis coordinate measuring machine.

In addition to one or more of the features described herein, or as an alternative, further embodiments of the methods may include that the articulated arm coordinate measuring machine comprises a first segment and a second segment joined at an elbow, and the probe assembly is attached to the second segment at a wrist.

In addition to one or more of the features described herein, or as an alternative, further embodiments of the methods may include that the first segment is connected to a base at a shoulder.

In addition to one or more of the features described herein, or as an alternative, further embodiments of the methods may include that the articulated arm coordinate measuring machine comprises a base housing electronics configured to perform the measurement of the position of the probe tip.

In addition to one or more of the features described herein, or as an alternative, further embodiments of the methods may include measuring the gap size of the gap at multiple different circumferential positions of the through-hole.

In addition to one or more of the features described herein, or as an alternative, further embodiments of the methods may include measuring a gap size of at least one second through-hole passing through the structural component.

These and other advantages and features will become more apparent from the following description taken in conjunction with the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

The detailed description explains embodiments of the disclosure, together with advantages and features, by way of example with reference to the drawings.

DETAILED DESCRIPTION

A probe assemblies may be used to provide high quality, repeatable measurements. Certain applications may require unique measurement tools. For example, when measuring gaps between mated sheets or layers of material, it may be difficult to measure such gaps by sliding a probe into the gap in a traditional manner. In view of this, conventionally, such gaps are measured using hand tools, such as 90° feeler gauges. Because such feeler gauges are manually operated and subjective, repeatability of measurements is low, and thus difficult to replicate consistently. In aerospace and marine applications, through-holes are common in structural components where multiple sheets or layers of materials are mated together (e.g., fuselage, cargo, doors, etc.). The tolerance and inspection requirements for such structures is very high to ensure compliance with part and application needs (e.g., on the order of 0.008 inches). Current methods for measuring such gaps is labor intensive, with each hole inspected by hand using a 90° feeler gauge at four locations about a circumference of a though-hole that is measured. Such manual measurement can result variations in measurement that are a result of human/operator error, is a time consuming process, and may not result in repeatable measurements. Some embodiments of the present disclosure are directed to using a probe on an articulated arm coordinate measuring machines (AACMM) to quickly and efficiently measure gaps between mated surfaces and ensure that such gaps are at a maximum gap or less.

Figure 1A:
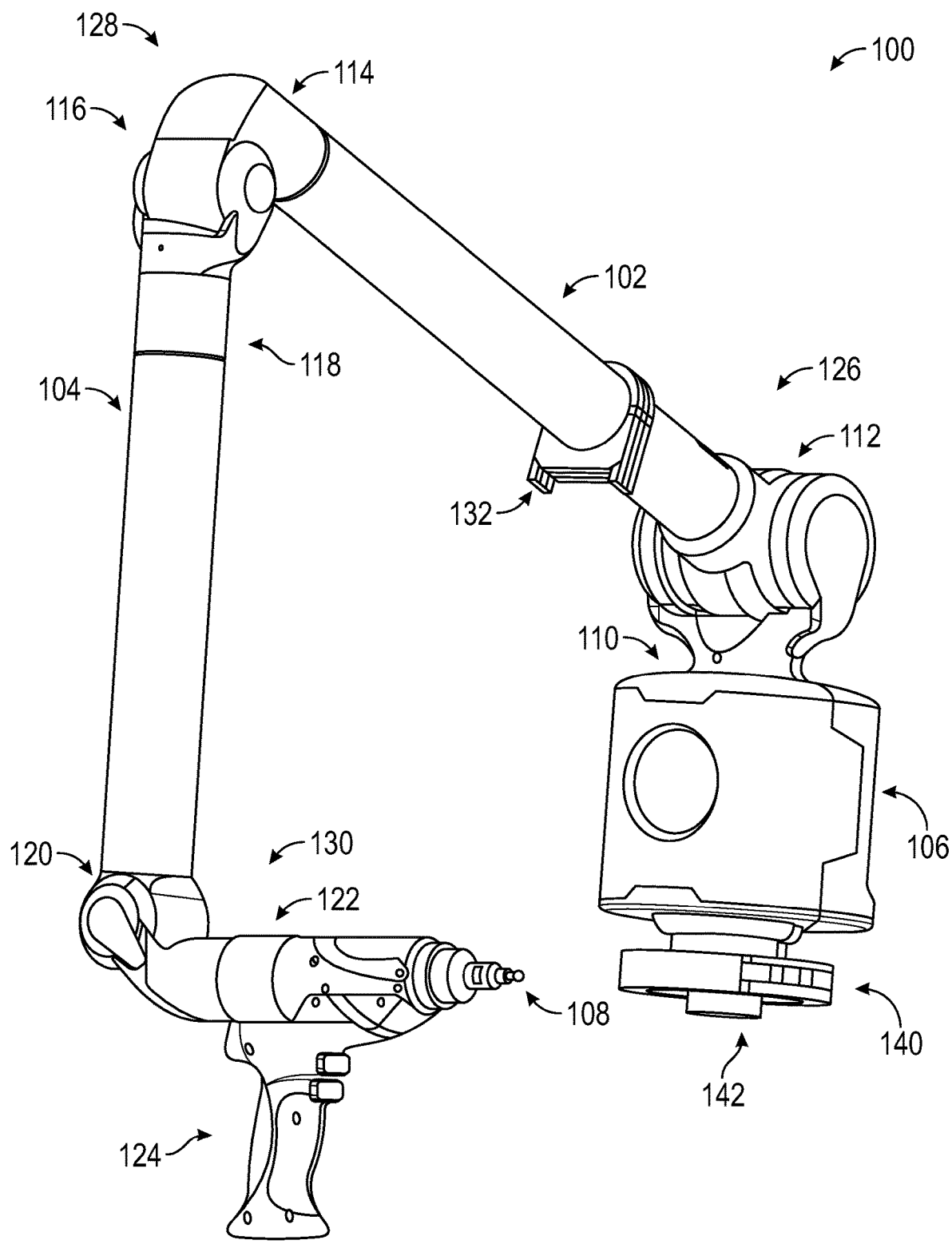
FIG. 1A is a schematic illustration of a portable articulated arm coordinate measuring machine (AACMM) in accordance with an embodiment of the present disclosure.
Figure 1B:
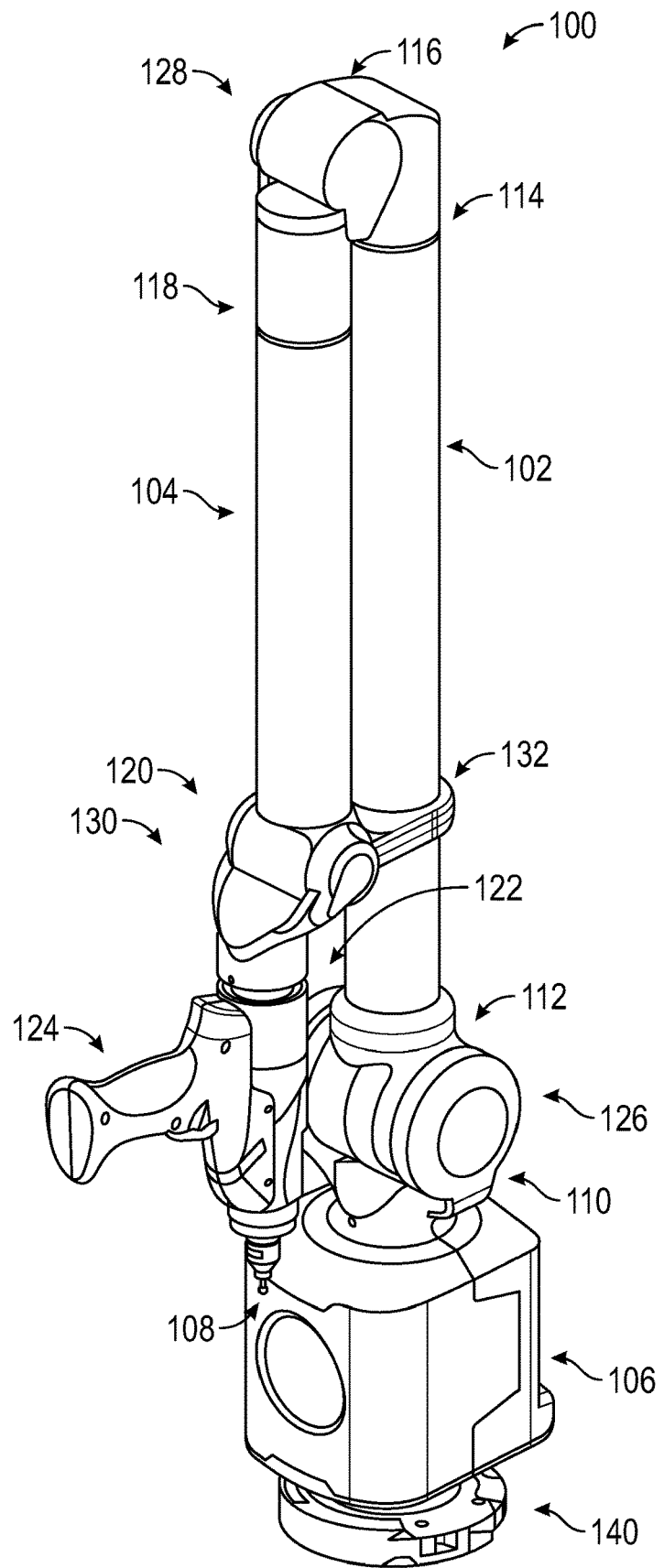
FIG. 1B is an alternative schematic illustration of the AACMM of FIG. 1A.
Figure 1C:
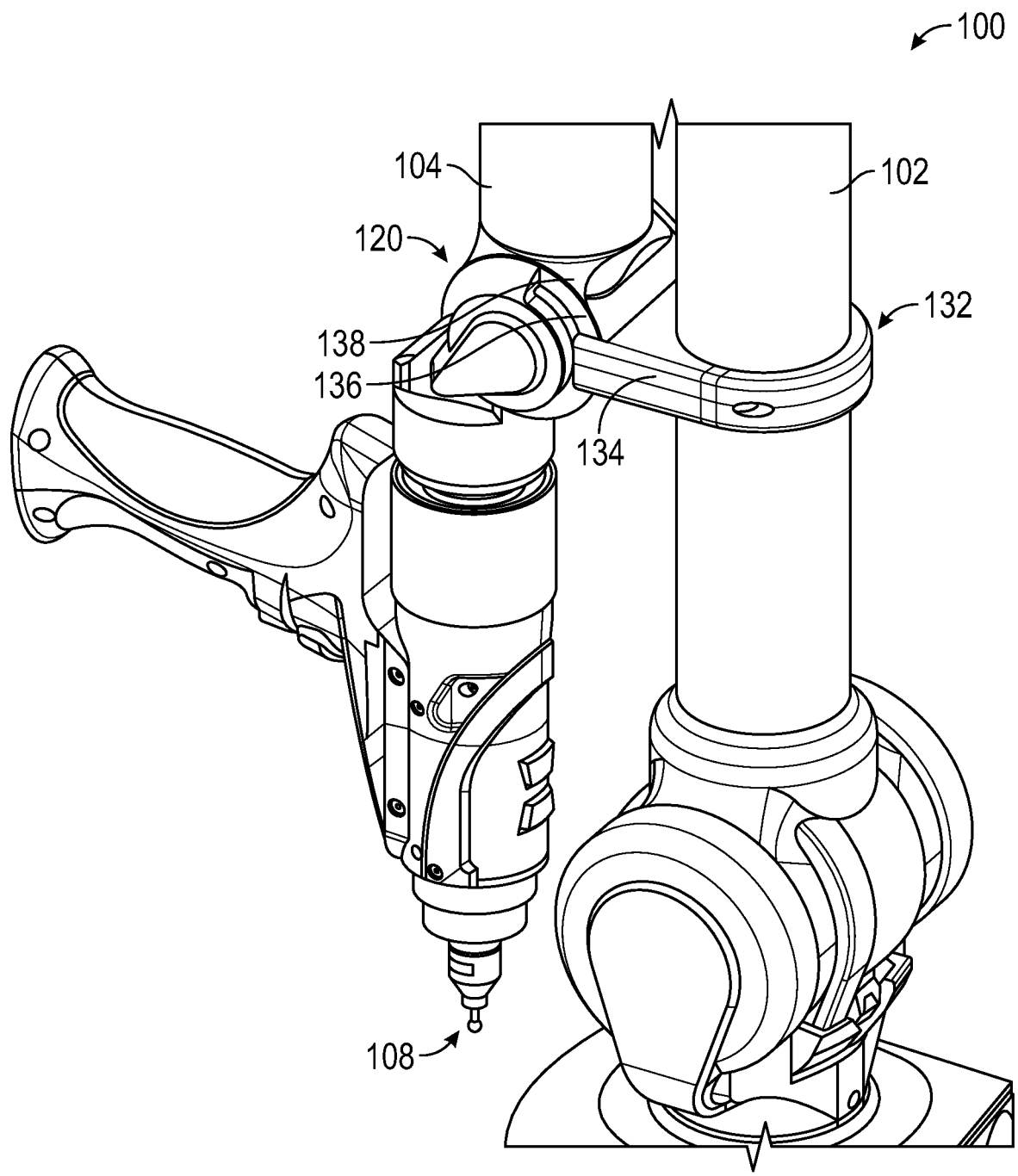
FIG. 1C is more detailed view of a portion of the AACMM of FIG. 1A.

FIGS. 1A-1C illustrate, in isometric view, an AACMM 100 that may incorporate embodiments of the present disclosure. The AACMM 100 is one example type of coordinate measuring machine. In an embodiment, a first segment 102 and a second segment 104 are connected to a base 106 on one end and a measurement device 108 on the other end. In an embodiment, the measurement device 108 is a probe assembly such as a tactile-probe assembly or a hard-probe assembly.

As illustrated in FIGS. 1A-1C, the AACMM 100 can include a number of rotational elements to allow for the articulation thereof. For example, the AACMM 100 may include seven rotational elements; and the AACMM 100 may be referred to as a seven-axis AACMM. In other embodiments discussed herein below, the AACMM 100 may be a six-axis AACMM or have any desired number of axes, without departing from the scope of the present disclosure. As illustrated, the AACMM 100 includes a first-axis assembly 110, a second-axis assembly 112, a third-axis assembly 114, a fourth-axis assembly 116, a fifth-axis assembly 118, a sixth-axis assembly 120, and a seventh-axis assembly 122. In an embodiment, the measurement device 108 includes a tactile probe assembly and a handle 124 are attached to the seventh-axis assembly 122. Each of the axis assemblies 110, 112, 114, 116, 118, 120, 122 may provide a rotational movement/measurement (e.g., swivel and/or hinge rotation). In the embodiment illustrated in FIGS. 1A-1C, the first-axis assembly 110 provides a swivel rotation about an axis aligned to a mounting direction of the base 106. In an embodiment, the second axis assembly 112 provides a hinge rotation about an axis perpendicular to the first segment 102. The combination of the first-axis assembly 110 and the second-axis assembly 112 is sometimes colloquially referred to as a shoulder 126 because, in some embodiments, the possible motions of the shoulder 126 of the AACMM 100 resemble the motions possible with a human shoulder.

In the embodiment illustrated in FIGS. 1A-1C, the third-axis assembly 114 provides a swivel rotation about an axis aligned to the first segment 102. The fourth-axis assembly 116 provides a hinge rotation about an axis perpendicular to second segment 104. The fifth-axis assembly 118 provides a swivel rotation about an axis aligned to the second segment 104. The combination of the third-axis assembly 114, the fourth-axis assembly 116, and the fifth-axis assembly 118 is sometimes colloquially referred to as an elbow 128 because, in some embodiments, the possible motions of the elbow 128 of the AACMM 100 resemble the motions possible with a human elbow.

In the embodiment illustrated in FIGS. 1A-1C, the sixth-axis assembly 120 provides a hinge rotation about an axis perpendicular to the second segment 104. In an embodiment, the AACMM 100 further comprises the seventh-axis assembly 122, which provides a swivel rotation of probe assemblies (e.g., measurement device 108) attached to the seventh axis assembly 122. The sixth-axis assembly 120, or the combination of the sixth-axis assembly 120 and the seventh-axis assembly 122, is sometimes colloquially referred to as a wrist 130 of the AACMM 100. The wrist 130 is so named because, in some embodiments, it provides motions similar to those possible with a human wrist. The combination of the shoulder 126, the first segment 102, the elbow 128, the second segment 104, and the wrist 130 resembles, in many ways, a human arm from (human) shoulder to (human) wrist. In some embodiments, the number of axis assemblies associated with each of the shoulder, elbow, and wrist may differ from the number shown in FIGS. 1A-1C. It is possible, for example, to move the third-axis assembly 114 from the elbow 128 to the shoulder 126, thereby increasing the number of axis assemblies in the shoulder to three and reducing the number of axis assemblies in the wrist to two. Other axis combinations are also possible without departing from the scope of the present disclosure.

In an embodiment, an optional parking clamp 132 may be incorporated into the AACMM 100. In this illustrative example embodiment, such a parking claim 132 is arranged on the first segment 102 includes parking-clamp fingers 134 (FIG. 1C) that tie together the first segment 102 to the second segment 104 while holding both segments 102, 104 in a vertical orientation. In an embodiment, the parking-clamp fingers 134 grip a parking clamp recess 136 while a sixth-axis yoke bumper 138 cushions the parking clamp 132 against the sixth-axis assembly 120, thereby reducing or preventing potential mechanical shock as the first segment 102 and the second segment 104 are brought together. In an embodiment, the parking clamp 132 holds the first segment 102 and the second segment 104 in fixed vertical orientation, thereby reducing or minimizing the space taken by the arm segments 102, 104 when the AACMM 100 is not in use performing a measurement. In an embodiment, an operator may release the parking clamp fingers 134, thereby permitting free movement of the arm segments 102, 104 as illustrated in FIG. 1A. In another embodiment, the parking clamp 132 is attached to the second segment 104 rather than the first segment 102. In another embodiment, the parking clamp fingers 134 attach to a different element than the parking-clamp recess 136 of FIG. 1C. In another embodiment, clamping is provided by a different mechanism than the parking-clamp fingers 134.

The AACMM 100 may be configured to be mounted to another structure and/or system. To accommodate mounting or attachment of the AACMM 100, the base 106 of the AACMM 100 includes a mounting device 140. The mounting device 140 may include, in some embodiments, a shock-absorber bumper 142 provides a way to cushion a potential drop of the AACMM 100 when affixing the AACMM 100 to a mounting ring or other structure.

In an embodiment, a portable articulated arm coordinate measuring machine (AACMM) includes: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; an electronic circuit that receives the position signal from the at least one position transducer and provides data corresponding to a position of the measurement device; and a processor operable to determine three-dimensional (3D) coordinates of a point measured by the measurement device based at least in part on the provided data corresponding to the position of the measurement device.

FIGS. 2A-2D are block diagrams of AACMM electronics 200 that are part of an AACMM in accordance with embodiments of the present disclosure. The AACMM electronics 200 may be housed within a base or otherwise electrically and/or operably coupled to the AACMM. The AACMM electronics 200 includes a modular power supply 202, one or more battery packs 204, and a power supply 206. The battery packs 204 may be smart battery packs. These elements are shown in greater detail in the block diagram of FIG. 2B. In an embodiment, the modular power supply 202 is located external to the power supply 206 and is plugged into an AC power main to provide a dual battery smart charger 208 with a voltage of 24 VDC. In an embodiment, the dual battery smart charger 208 provides a portion of the voltage from the modular power supply 202 to charge the one or more battery packs 204. In an embodiment, a System Management Bus (SMBUS) 210, which may be a single-ended simple two-wire bus for the purpose of lightweight communication, provides communication among the dual battery smart charger 208 and the battery packs 204. In an embodiment, the battery packs 204 include a first battery pack 204a and a second battery pack 204b. In an embodiment, one battery pack 204a may provide electrical power to the AACMM 100 while the other battery pack 204b is being charged (and the opposite is true). In an embodiment, either or both battery packs 204a, 204b may be removed while power from the modular power supply 202 is being applied. In other words, the battery packs 204a, 204b may be "hot swapped."

In a non-limiting example embodiment, each battery pack 204a, 204b includes a 14.4 VDC lithium-ion battery. In some embodiments, the battery packs 204a, 204b may be disposed in a base of the AACMM (e.g., base 106 shown in FIGS. 1A-1C) behind battery doors and the base may include various power indicators and/or associated ports/connectors, as will be appreciated by those of skill in the art.

Figure 2A:
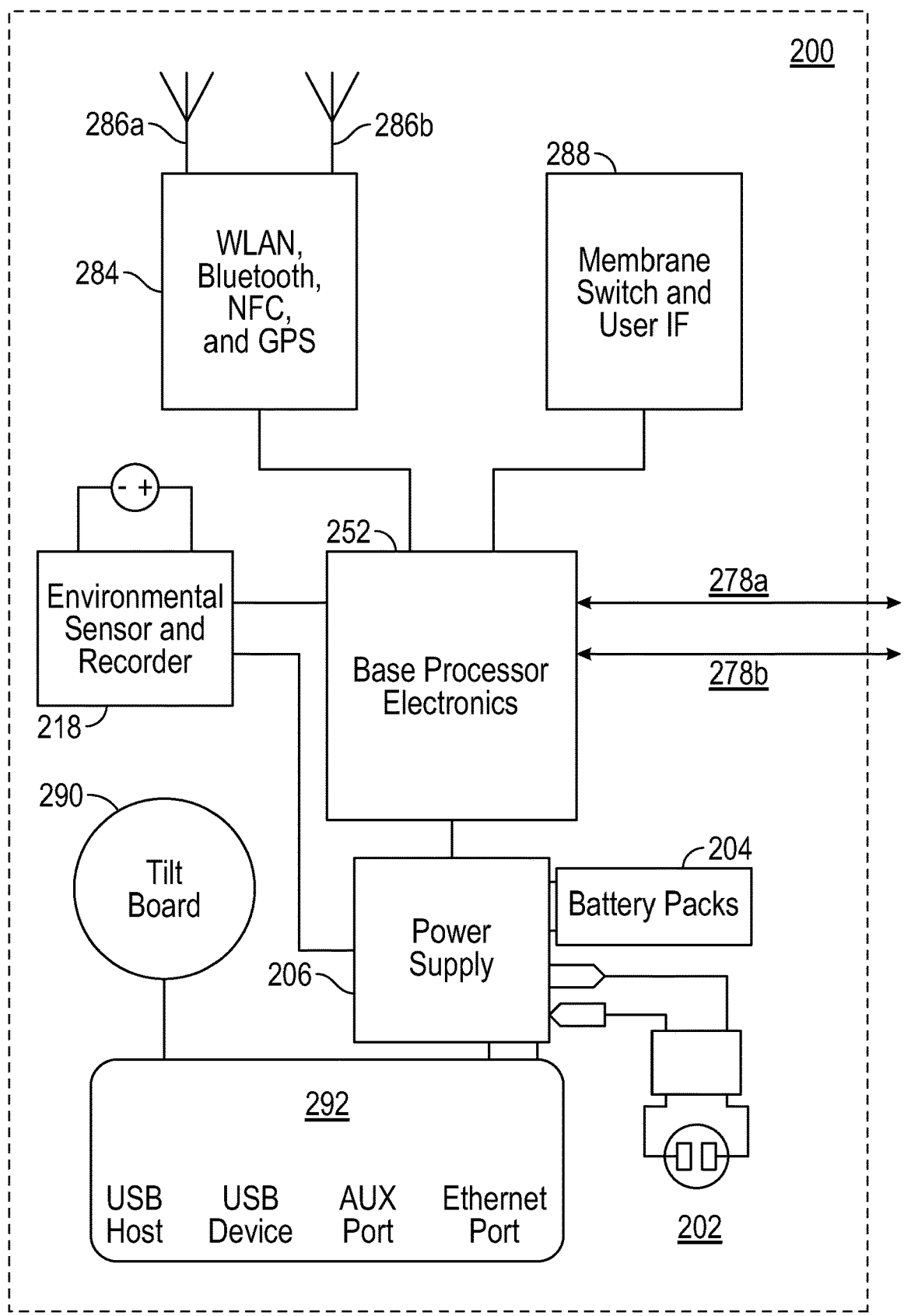
FIG. 2A is a block diagram of base electronics of an AACMM according to an embodiment of the present disclosure.
Figure 2B:
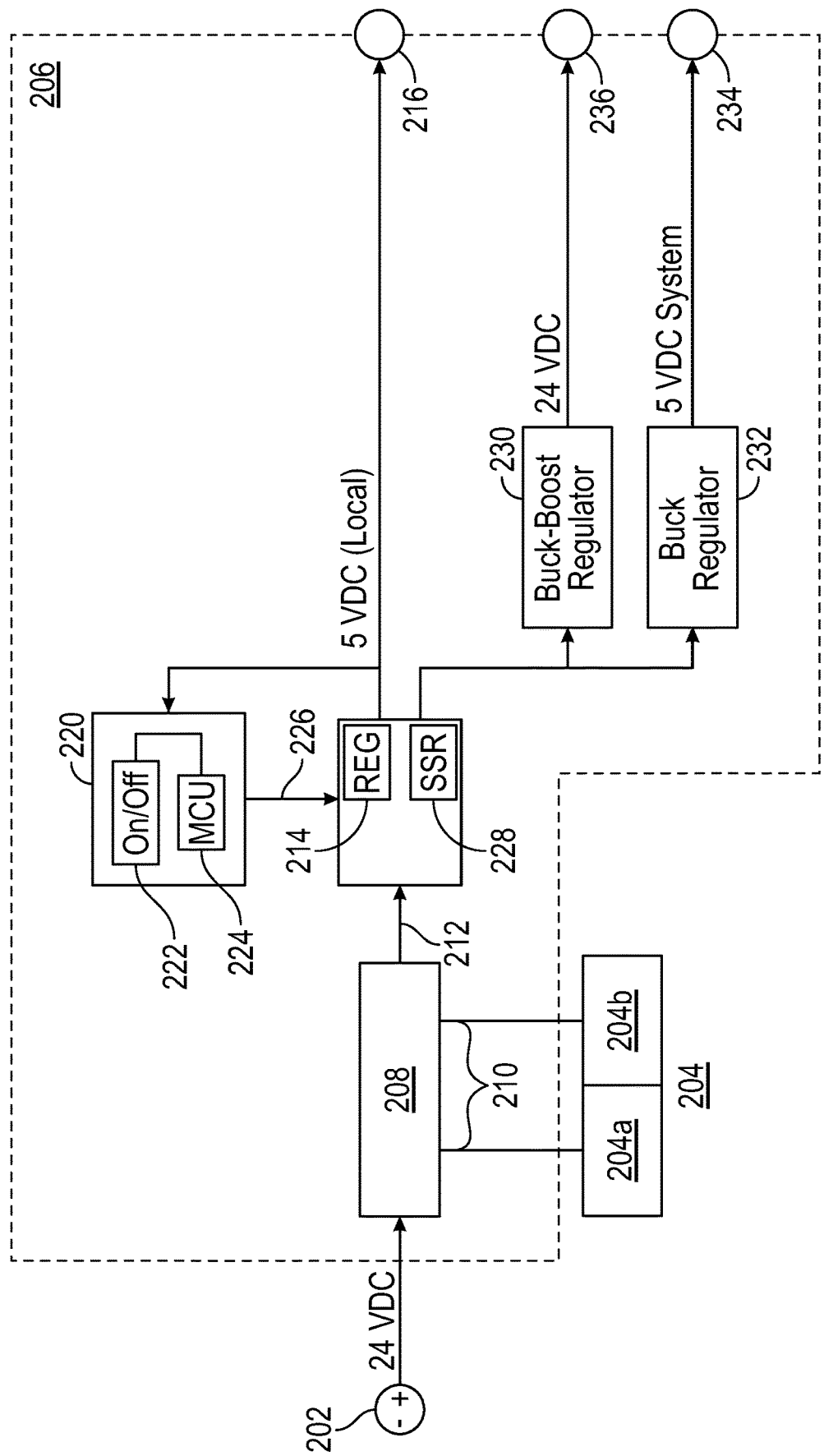
FIG. 2B is a block diagram illustrating details of elements of the base electronics of FIG. 2A according to an embodiment of the present disclosure.

As shown in FIG. 2B, part of the electrical power passing through a line 212 arrives at a regulator 214, which provides a 5 VDC local voltage through a point 216 to an environmental sensor and a recorder 218 (FIG. 2D) and to a user interface (IF) 220, which includes an electrical on/off switch 222 and a microcontroller (MCU) 224. The electrical on/off switch 222 is configured to be activated in response to pressing of a mechanical on-off button on the AACMM (e.g., on a base thereof). When the on/off switch 222 is in the on state, the MCU 224 is configured to produce a signal 226 that causes a solid-state relay (SSR) 228 to close, passing the voltage on the line 212 to a buck-boost regular 230 and a buck regulator 232. The buck regulator 232 is configured to provide a 5 VDC system voltage, which from a point 234 is stepped down to secondary voltages 3.3 VDC, 1.8 VDC, 1.5 VDC, and 1.2 VDC for use by processors and memory. The buck-boost regulator 230 is configured to provide a 24 VDC signal from a point 236 to electronics in arm segments, the arm end, and accessories attached to the arm end of the AACMM.

Figure 2C:
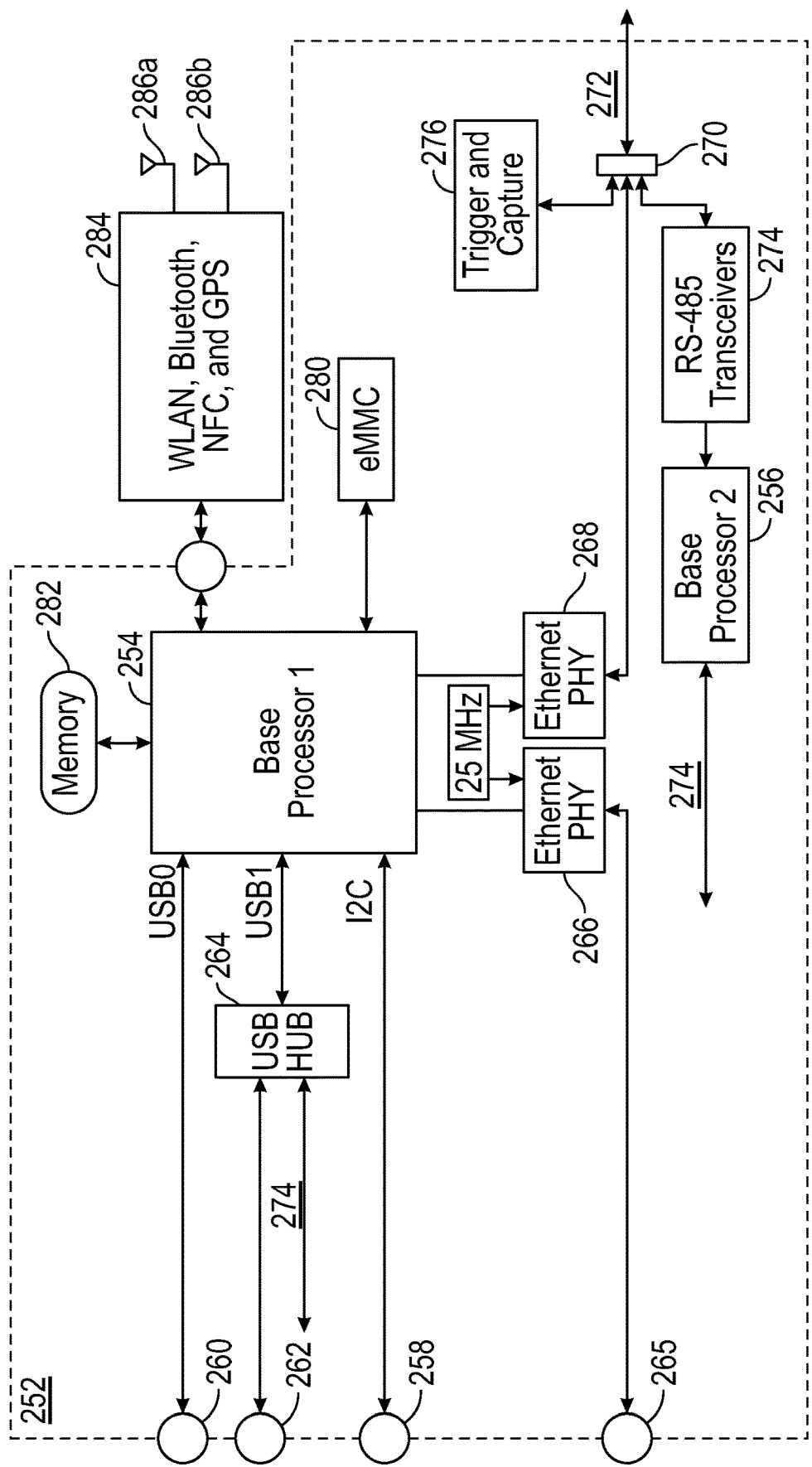
FIG. 2C is a block diagram illustrating details of elements of the base electronics of FIG. 2A according to an embodiment of the present disclosure.
Figure 2D:
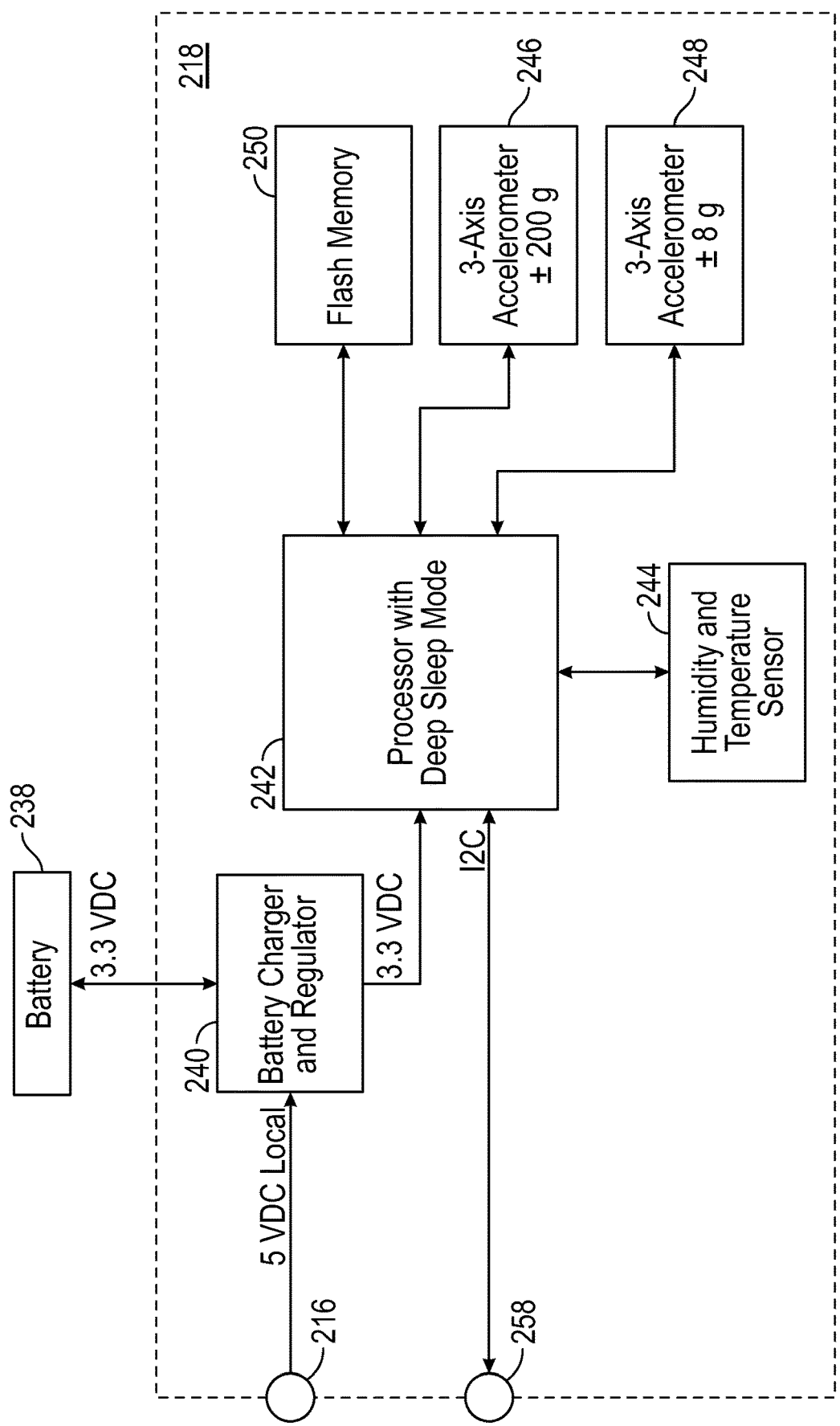
FIG. 2D is a block diagram illustrating details of elements of the base electronics of FIG. 2A according to an embodiment of the present disclosure.

A block diagram of the environmental sensor and recorder 218 is shown in FIG. 2D. If the voltage on the line 212 is zero, then the 5 VDC local voltage is not present at the point 216 in the environmental sensor and recorder 218. In this case, a battery 238 provides a 3.3 VDC signal to the components of the environmental sensor and recorder 218. The 3.3 VDC signal passes through a battery charger and regulator 240 to provide the 3.3 VDC signal to a processor with deep-sleep mode 242. The processor 242 is configured to receive readings from a humidity-and-temperature sensor 244, a three-axis accelerometer 246 that is configured to measure to ±200 g, and a three-axis accelerometer 248 that is configured to measure to ±8 g. In an example operation, the processor 242 is configured to store readings every 15 minutes on a flash memory 250. In an embodiment, the processor 242 is configured to save, on the flash memory 250, large acceleration events observed by the three-axis accelerometers 246, 248. If the 5 VDC local voltage is present at the point 216, then the battery charger 240 is configured to use the 5 VDC local voltage to charge the battery 238.

FIG. 2C is a block diagram of base processor electronics 252 of the AACMM electronics 200, which includes a first base processor 254 and a second base processor 256. In an embodiment, the second base processor 256 is a real-time processor. In an embodiment, the processor with deep sleep mode 242 (FIG. 2D) is configured to communicate with the first base processor 254 over an Inter-Integrated Circuit (I2C) bus through the point 258. In an embodiment, whenever electrical power is being provided to the AACMM 100 by the modular power supply 202 rather than a battery pack 204, the first base processor 254 is configured to provide a 5 VDC, 2.5 Amp signal through a Universal Serial Bus (USB) external device port 260 for use by any external device. This voltage may be provided to a USB charging port of such external device. In such embodiments, a user may attach any compatible device to obtain power from the USB charging port. Currently USB standards are ratified by a USB Implementers Forum (USB-IF).

In an embodiment, the first base processor 254 is configured to exchange data through a point with one or more external USB host devices, such as external computing devices, over a USB data transfer port. In an embodiment, electrical signals pass to and from the USB host device through a point 262 to a USB hub 264 and on to the first base processor 254.

In an embodiment, an Ethernet signal may be provided over an Ethernet port. Ethernet is a computer networking technology based on IEEE 802.3 standards. The Ethernet signal arrives at a point 265 in FIG. 2C, travels to an Ethernet PHY 266, which may be clocked at 25 MHz, before arriving at the first base processor 254. The Ethernet PHY 266 may be configured to provide analog signals physical access to a link layer.

A second Ethernet path enables bidirectional communication with electrical components internal to the AACMM 100. The second Ethernet path, which includes an Ethernet PHY 268, passes through a connector 270 to join a collection of busses 272. In an embodiment, the Ethernet is gigabit Ethernet, which means that data may be transferred at a rate of one gigabit per second. In an embodiment, the second Ethernet path mainly transfers data obtained by AACMM accessory devices such as laser line probes (LLPs).

In an embodiment, electrical signals obtained from a tactile-probe assembly (e.g., measurement device 108) pass through an RS-485 transceiver 274 before arriving at the second base processor 256. Examples of a tactile-probe assembly are a hard-probe assembly and a touch-trigger probe assembly. When directed by an operator, a hard-probe assembly is configured to return encoder readings to the base processor electronics 252 at regular intervals set by a capture signal sent from the base processor electronics 252. At each capture interval, angular readings are returned to the base processor electronics 252, thereby enabling calculation of a position of a probe tip on the hard-probe assembly. In contrast, a touch-trigger probe assembly is configured to trigger a reading when a designated force is applied to the probe tip. As such, angular readings are taken in response to the trigger signal sent from the touch-trigger probe assembly. A signaling unit 276 is configured to broadcast capture signals and configured to receive trigger signals. In an embodiment, the capture signals and trigger signals travel along a first bus 278a, shown in FIG. 2A. The second base processor 256 is configured to communicate with the first base processor 254 through a USB slave line 274 that passes through the USB hub 264 coupled to the first base processor 254.

In an embodiment, the first base processor 254 further connects to an embedded Multi-Media Controller (eMMC) 280, which includes both flash memory and a flash memory controller integrated on the same silicon die. In an embodiment, the first base processor 254 further connects to a memory 282, which in an embodiment is a double data rate type-three synchronous dynamic random-access memory (DDR3 SDRAM).

In an embodiment, the base processor electronics 252 further interfaces with a board 284 having accessory communication and sensor devices. In an embodiment, the board 284 includes a wireless local area network (WLAN). In an embodiment, the WLAN 2101 is an IEEE 802.11 Wi-Fi network may be enabled by pressing a Wi-Fi button or the like, that is part of or on the AACMM. Wi-Fi enables wireless communication between the AACMM and an external device such as a stationary or mobile computing device.

In an embodiment, the board 284 further includes a Bluetooth™ Low Energy (BLE) device capable of wirelessly exchanging data with external devices such as computing devices. BLE is a wireless personal area network technology designed and marketed by the Bluetooth Special Interest Group. The BLE device may be enabled by pressing a Bluetooth™ button on the AACMM. The on-off button, the Wi-Fi button, and the Bluetooth™ button, and any other buttons, switches, tabs, actuators, knobs, dials, and the like may be part of a larger membrane switch and user interface (IF) 288 shown in FIG. 2A.

In an embodiment, the board 284 may include near-field communication (NFC) hardware. In an embodiment, the NFC hardware includes a dual-interface memory/tag device that communicates with an external NFC reader and a wired port that communicates with the first base processor 254. In another embodiment, the NFC hardware includes a single-port NFC tag that communicates with an external NFC reader but may not include a wired port for communicating with the first base processor 254. The single-port NFC tag may be configured to store and transmit device data such as serial number, configuration information/data, revision data, or encoder identification data. Descriptions of NFC use in AACMMs are given in commonly owned United States Published Patent Applications 2015/0330761, 2015/0330762, 2015/0330763, 2015/0330764, 2015/0330765, 2015/0330766, the contents all of which are incorporated by reference herein.

In an embodiment, the board 284 may include a global positioning system (GPS) receiver. In an embodiment, the GPS receiver is used to track the location of the AACMM, for example, to determine the location of the AACMM when leased. In another embodiment, the GPS receiver may be used to synchronize multiple instruments, which may include AACMMs, laser trackers, scanners, or other devices. Descriptions of GPS used with AACMMs are given in United States Published Patent Application 2015/0355310, the contents of which is incorporated by reference herein. In an embodiment, WLAN, Bluetooth™, NFC, and GPS components and operation there may be used in conjunction with antennas, which may include antennas 286a, 286b.

As shown in FIG. 2A, the AACMM electronics 200 may further include a tilt board 290, a connector interface 292, and a second bus 278b. It will be appreciated that the AACMMs and the AACMM electronics of systems in accordance with embodiments of the present disclosure may include additional electronic components, as will be appreciated by those of skill in the art. Furthermore, in some embodiments, various of the described components may be omitted depending on the particular application and assembly and/or based on the type of probe used with the AACMM. As such, those of skill in the art will appreciated that the components and configuration shown and described in FIGS. 2A-2D is merely for illustrative and explanatory purposes and is not intended to be limiting the present disclosure to the specific configuration and arrangement as shown and described.

Figure 3:
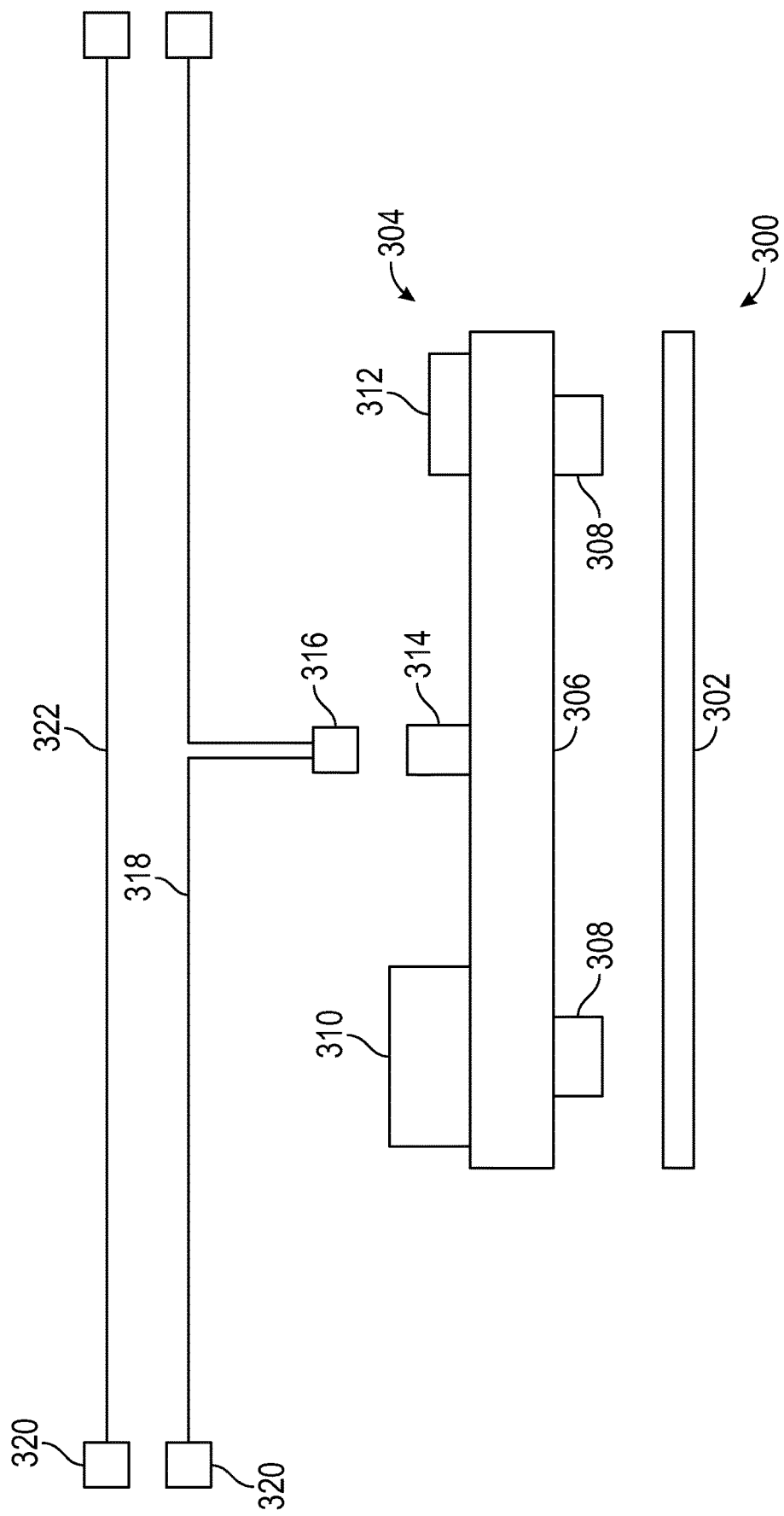
FIG. 3 is a block diagram of bus cables and their relation to encoder components according to an embodiment of the present disclosure.

Referring now to FIG. 3, angles of rotation of axis assemblies of an AACMM in accordance with an embodiment of the present disclosure are shown. In this illustrative embodiment, the angle of rotation of such axis assemblies may be measured using angular transducers. In an embodiment, the angular transducers are angular encoders 300, elements of which are illustrated schematically in FIG. 3. In an embodiment, an angular encoder 300 includes an encoder disk 302 and encoder electronics 304. In an embodiment and as shown, the encoder electronics 304 may include an encoder printed circuit board (PCB) 306, one or more read heads 308, a processor and support electronics 310, a temperature sensor connector 312, and a board connector 314. In an embodiment, the encoder disk 302 includes a collection of radially directed lines, the positions of which are sensed by one or more of the read heads 308 and the sensed positions processed with processor and support electronics 310, to determine an angle of rotation of the encoder disk 302 in relation to the read heads 308. In an embodiment, each board connector 314 is attached to a T-connector 316 of a T-cable 318 within a first bus (e.g., first bus 278a shown in FIG. 2A). Each encoder PCB 306 connects to a corresponding T-cable 318 of the first bus. Cable connectors 320 on each end of the T-cable 318 attach to cable connectors 320 on adjacent T-cables 318 in the AACMM 100. In this way, angle information may be transferred from each angular encoder 300 through the first bus to the main processor electronics for further processing (e.g., base processor electronics 252 of the AACMM electronics 200 shown in FIG. 2A). The transmitted angles may be synchronized to a capture signal, which in an embodiment has a rate of around one kilohertz. By connecting a single T-connector 316 to a corresponding single board connector 314, the angular encoders 300 continue to send angle readings to the base processor electronics even if one or more of the encoder electronics 304 are disconnected from the first bus. In an embodiment, the cable connectors 320 are provided on each end of an interconnect cable 322 of a second bus (e.g., second bus 278b shown in FIG. 2A). the cable connectors 320 of adjacent interconnect cables 322 are connected together to provide a continuous electrical path for the second bus.

Figure 4A:
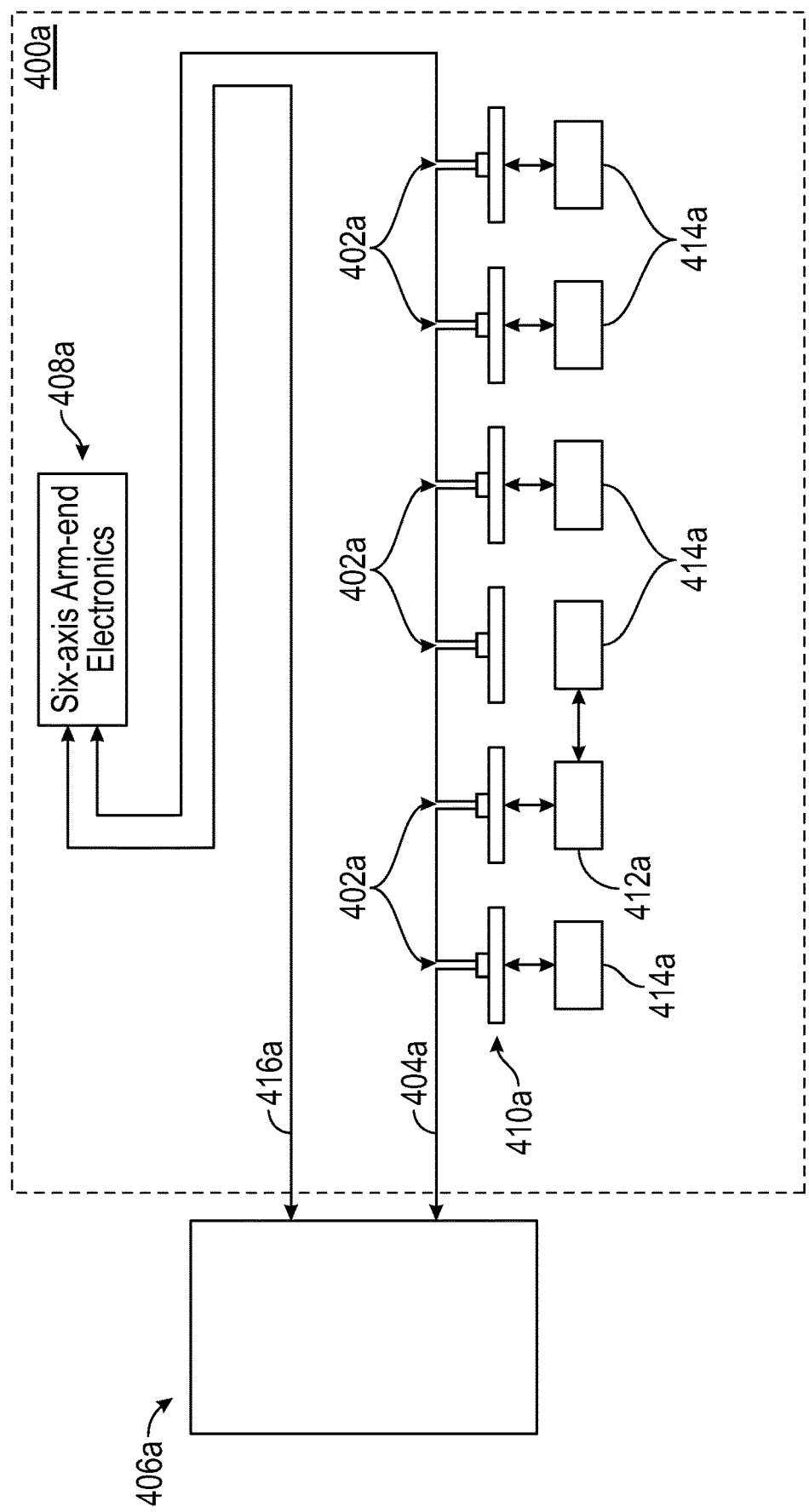
FIG. 4A is a block diagram of interconnecting elements of a six-axis system according to an embodiment of the present disclosure.

FIG. 4A shows electrical elements 400a of a six-axis AACMM in accordance with an embodiment of the present disclosure. The electrical elements 400a include six angular encoders 402a attached by a first bus 404a to base processor electronics 406a on one end (e.g., base processor electronics 252 of the AACMM electronics 200 shown in FIG. 2A), and to six-axis arm-end electronics 408a on the other end. In an embodiment and as shown, encoder PCBs 410a are attached to respective expandable temperature sensors 412a. When an expandable temperature sensor 412a is attached to a temperature sensor connector (e.g., shown in FIG. 3), a further temperature sensor 414a may be attached to the expandable temperature sensor 412a. In an embodiment, some temperature sensors 414a are not expandable. In an embodiment, at least one temperature sensor 414a, 412a, may be placed in the vicinity of each angular encoder 402a to provide for compensation of angular readings to account for thermal expansion. In an embodiment, further temperature sensors 414a, 412a may be placed in the vicinity of a first segment of an AACMM (e.g., first segment 102 shown in FIG. 1A) and a second segment of the AACMM (e.g., second segment 104 shown in FIG. 1A) to allow for the compensation of the segment lengths to account for thermal expansion of the segments. In an embodiment, the compensated segment lengths are used by the base processor electronics 406a or by associated computing devices to more accurately determine 3D coordinates measured by the AACMM. In an embodiment, a second bus 416a electrically attaches base processor electronics 406a to the six-axis arm-end electronics 408a.

Figure 4B:
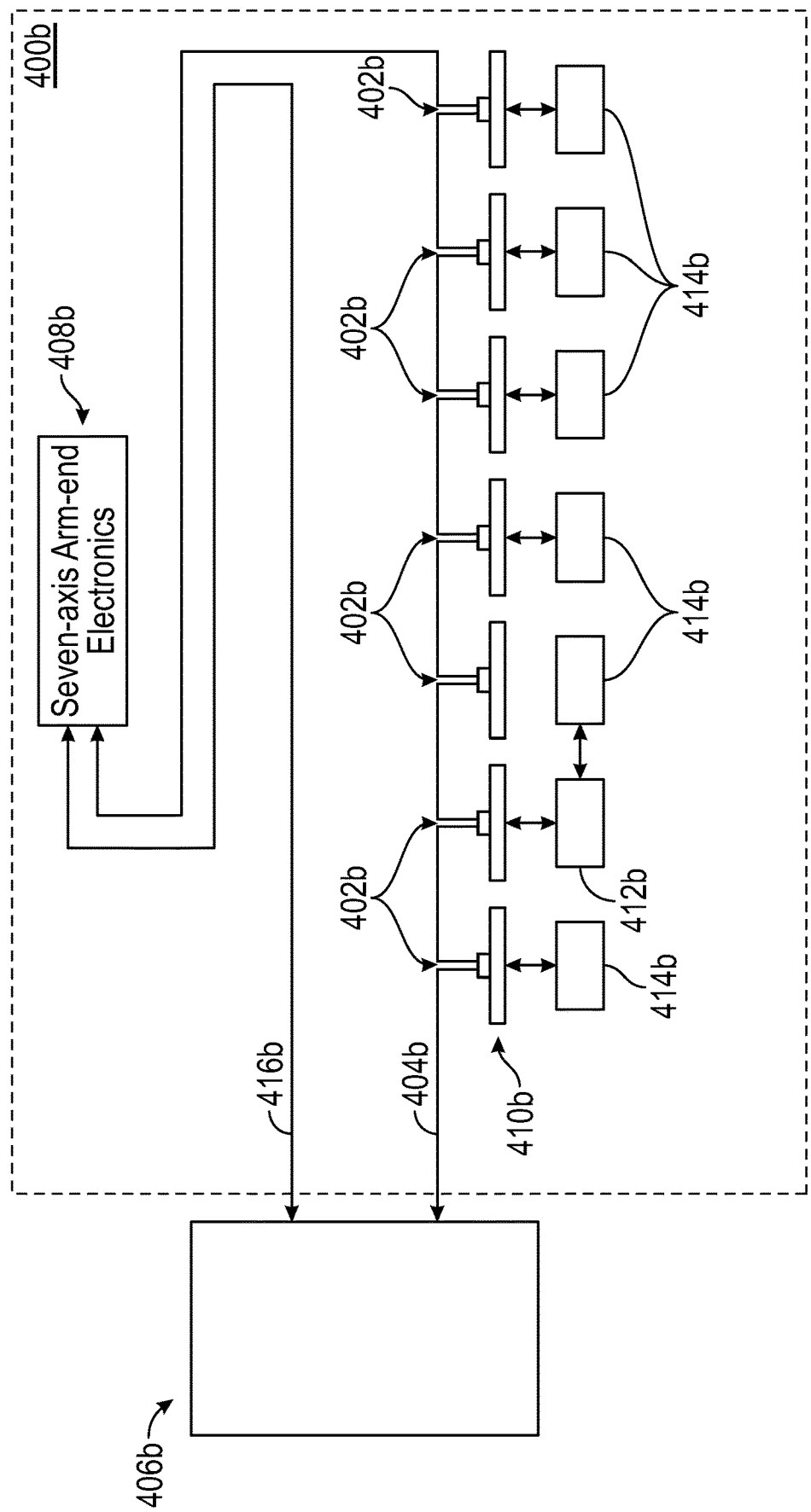
FIG. 4B is a block diagram of interconnecting elements of a seven-axis system according to an embodiment of the present disclosure.

FIG. 4B shows electrical elements 400b in a seven-axis AACMM. The electrical elements 400b include seven angular encoders 402b attached by a first bus 404b to base processor electronics 406b on one end and to seven-axis arm-end electronics 408b on the other end. In an embodiment, one or more of the encoder PCB s 410b are attached to an expandable temperature sensor 412b. When an expandable temperature sensor 412b is attached to a temperature sensor connector, one or more further temperature sensors 414b may be attached to the expandable temperature sensor 412b. In an embodiment, some temperature sensors 414b are not expandable. In an embodiment, at least one temperature sensor 412b, 414b is placed in a vicinity of the angular encoders 402b to allow for the compensation of angular readings to account for thermal expansion. In an embodiment, further temperature sensors 412b, 414b may be placed in the vicinity of a first segment and a second segment of an AACMM to allow for the compensation of segment lengths to account for thermal expansion of the segments. In an embodiment, the compensated segment lengths are used by the base processor electronics 406b or by associated computing devices to more accurately determine 3D coordinates measured by the AACMM. In an embodiment, a second bus 416b electrically attaches the base processor electronics 406b to the seven-axis arm-end electronics 408b.

Figure 5:
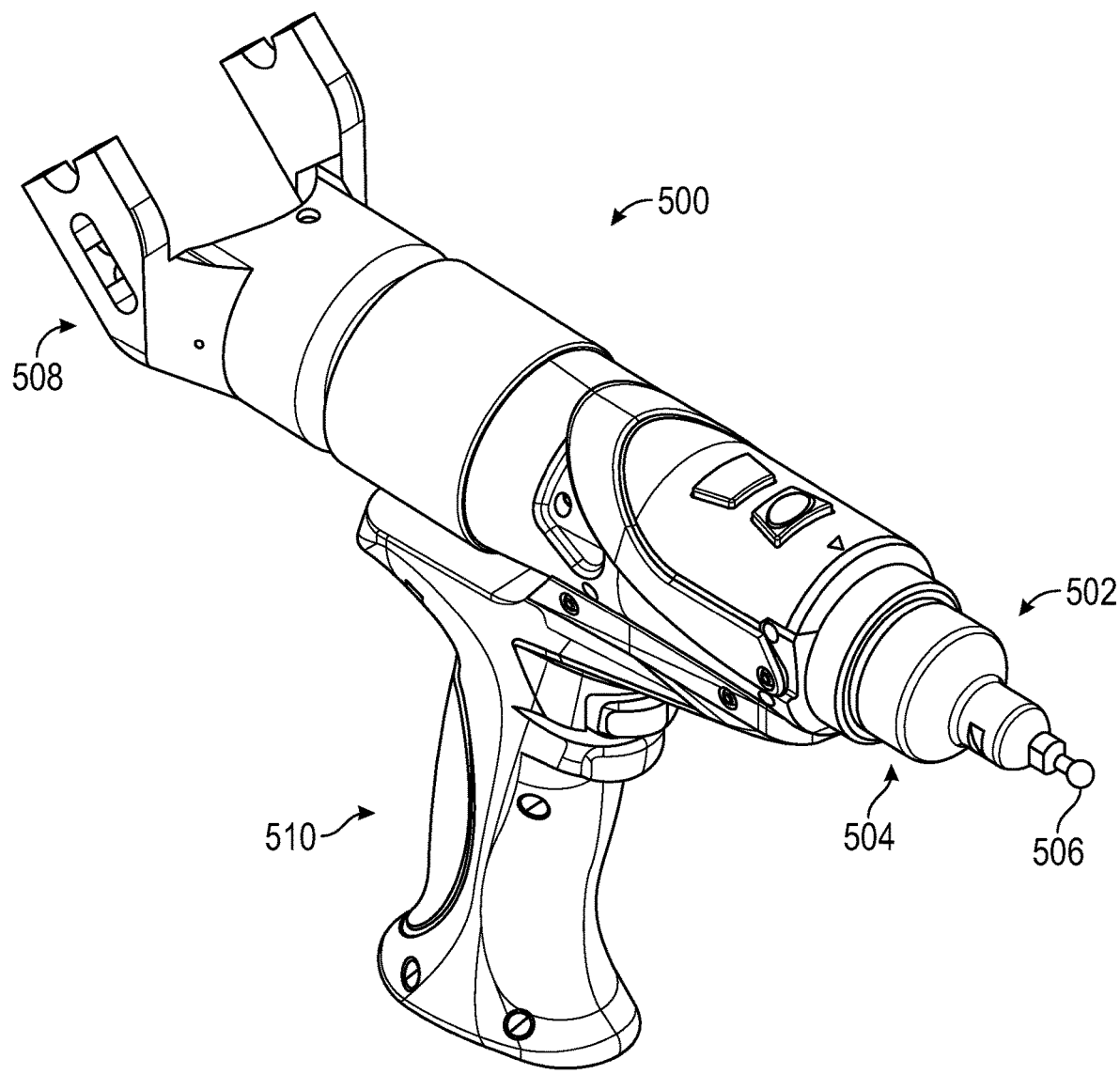
FIG. 5 is a block diagram of a probe assembly according to an embodiment of the present disclosure.

A hard-probe assembly 500 in accordance with an embodiment of the present disclosure is shown in FIG. 5. The hard-probe assembly 500 includes a probe stylus assembly 502 that is mounted or otherwise attached to a probe body 504. Various components may electrically and mechanically attach the probe stylus assembly 502 to the probe body 504. For example, such interface and connection can include, without limitation, a probe electrical interface, a lock nut, a spring stack, a probe cap, a pull stud, kinematic cylinders, and the like. In an embodiment, the probe stylus assembly 502 is threaded to screw into the probe body 504. In an embodiment, the probe stylus assembly 502 includes a spherical probe tip 506. In an embodiment, the probe body 504 includes a hollow portion sized to accept the probe electrical interface. In an embodiment, the probe electrical interface includes a probe electrical interface circuit board, a probe interface body, and spring-loaded pins that pass through the probe interface body. In an embodiment, the probe electrical interface board includes a processor, a memory, and a touch-probe connector adapter. In an embodiment, the hard-probe assembly 500 further includes a lock nut, a spring stack, a probe cap, a pull stud and kinematic cylinders. The lock nut and spring stack may be configured to hold the pull stud against the probe cap. The kinematic cylinders may be affixed to the probe cap. The hard-probe assembly 500 may be configured to attach to an AACMM at an attachment yoke 508 and/or may include a handle 510 for manual operation of the hard-probe assembly 500.

The hard-probe assembly 500 discussed above is an example of a tactile probe, so named because a tactile probe includes an element (such as the probe tip 506) that makes physical contact with an object under test. Besides the hard-probe assembly 500, embodiments of the present disclosure may employ other types of tactile probes, such as a touch-trigger probe assembly. Unlike the hard-probe assembly 500 that returns electrical signals from encoders in each of the axis assemblies in synchrony with a capture signal produced by base processor electronics, a touch-trigger probe assembly may be configured to generate a trigger signal in response to a probe tip lightly touching an object under test. The trigger signal is sent from the touch-trigger probe assembly to each of the encoders, which respond by immediately measuring an angle. Afterwards, the encoders return the measured values over the first bus. Touch-trigger probes are popular to use on Cartesian coordinate measuring machines (CMMs), which often include a probe stylus that is relatively long and thin. Such a stylus is susceptible to bending when pressed against an object, which may result in a relatively large error in measured 3D values. By generating a trigger signal when the probe tip first lightly touches the object, the bending of the stylus is minimized. In most cases, the stylus on a tactile probe of an AACMM is relatively short and thick, resulting in relatively small bending errors. However, in some cases, bending of a stylus is an important consideration when making AACMM measurements. In these cases, the touch-trigger probe assembly is advantageously used. It should be appreciated that the probe stylus assembly 502 and the probe tip 506 may be provided in different sizes (e.g., the diameter of the probe tip) or lengths (e.g., the distance between the probe tip and the probe body) depending on the application and measurement being performed. The illustrated probe stylus assembly 502 is for example purposes only and not intended to be limiting.

The above described AACMM and associated probes (e.g., hard probes and the like) may be used to make measures of various components. For example, through-holes through materials, such as structural components, may require measurement due to mating of multiple different materials or sheets of material that are assembled to form such structural components. Examples of such structural components may be walls or the like around pressure bulkheads and cargo doors of aircraft, seacraft, and the like. Such structural components may include through-hole to allow for fasteners or the like to pass through (e.g., rivets) for the purpose of joining multiple sheets of material that make up the structural component. In some such structural components, there may be two mating materials of differing thickness and stiffness, which such mating materials requiring assembly to form the desired structure. Manufacturing of such structural components may have variations which can result in custom shims being needed to reduce a gap and load between the two materials (e.g., sheets, layers, etc.) to an acceptable level. An example of such gap requirement may be less than 0.008 inch for carbon fiber and 0.010 inch for metal when the acceptable load force is applied.

Figure 6A:
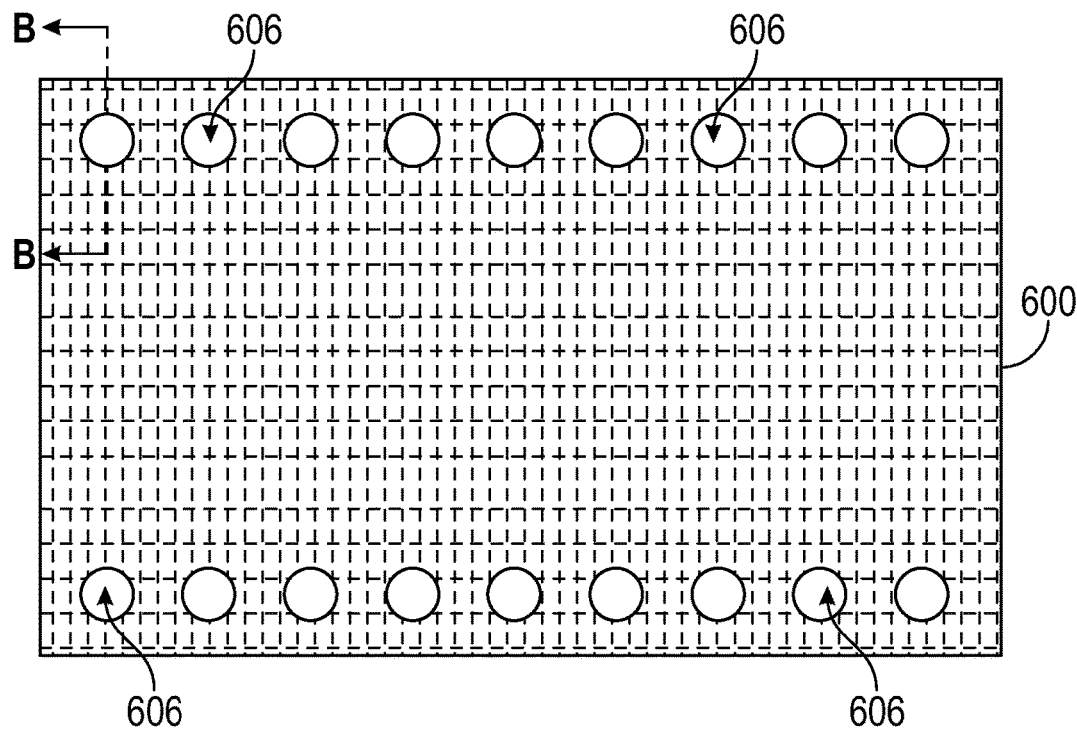
FIG. 6A is a schematic illustration of a structural component having through-holes to be measured in accordance with an embodiment of the present disclosure.
Figure 6B:
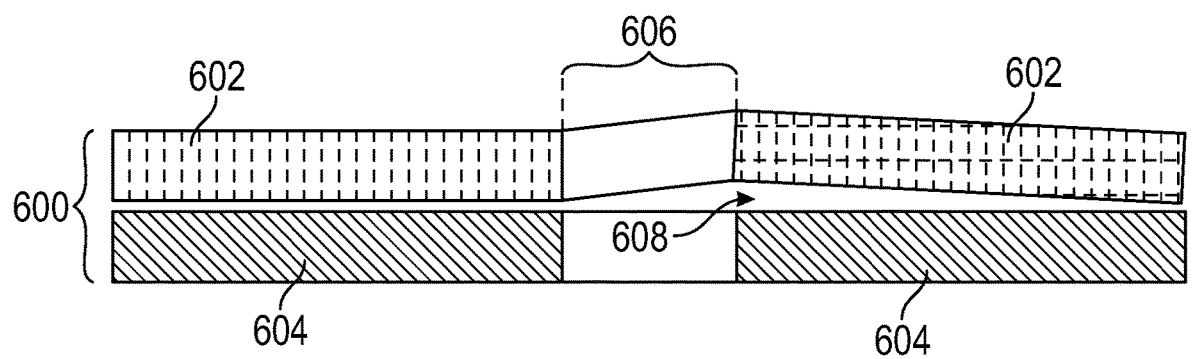
FIG. 6B is a cross-sectional illustration of a portion of the structural component of FIG. 6A as viewed along the line B-B shown in FIG. 6A.

For example, referring now to FIGS. 6A-6B, schematic illustrations of a structural component 600 that may be inspected and measured is shown. FIG. 6A is a plan view of the structural component 600 and FIG. 6B is a cross-sectional view along the line B-B of FIG. 6A. The structural component 600 is formed from a first material layer 602 and a second material layer 604 that are assembled together to form the structural component 600. One or more through-holes 606 are formed in the structural component 600 to receive fasteners or the like for mechanically coupling the first material layer 602 to the second material layer 604. The first material layer 602 and the second material layer 604 may be formed from different materials and a gap 608 may be present between the two material layers 602, 604. Inspection of these through-holes 606 is important to ensure that the gaps 608 do not exceed a predetermined maximum threshold. That is, it may be desirable to ensure that the gap 608 does not exceed a maximum separation distance between the first material layer 602 and the second material layer 604.

Under conventional inspection processes, each through-hole 606 is inspected with a 90° feeler gauge at, for example, four locations (e.g., 12, 3, 6, and 9 o'clock positions about the through-hole 606) to ensure the gap 608 after installation of custom shim(s) is less than predetermined maximum gap of 0.008 inch (or 0.010 inch metal). It has been determined that such inspection process/method may result in operator variations of up to 0.003 inch. Such a high level of variation may not be acceptable for certain applications. Furthermore, because the conventional inspection process relies on human inspectors, the process have a low level of accurate repeatability.

Embodiments of the present disclosure are directed to providing a system and process for measuring gaps between material layers using an AACMM, such as described above, in combination with a probe that can provide highly accurate and repeatable measurements of the gaps. For example, in some embodiments, a probe stylus assembly having a suitable ball probe of a calibrated diameter may be installed at the end of an AACMM and operated to identify gaps using displacement along a circumference of the through-hole as an indication of gap size.

Figure 7:
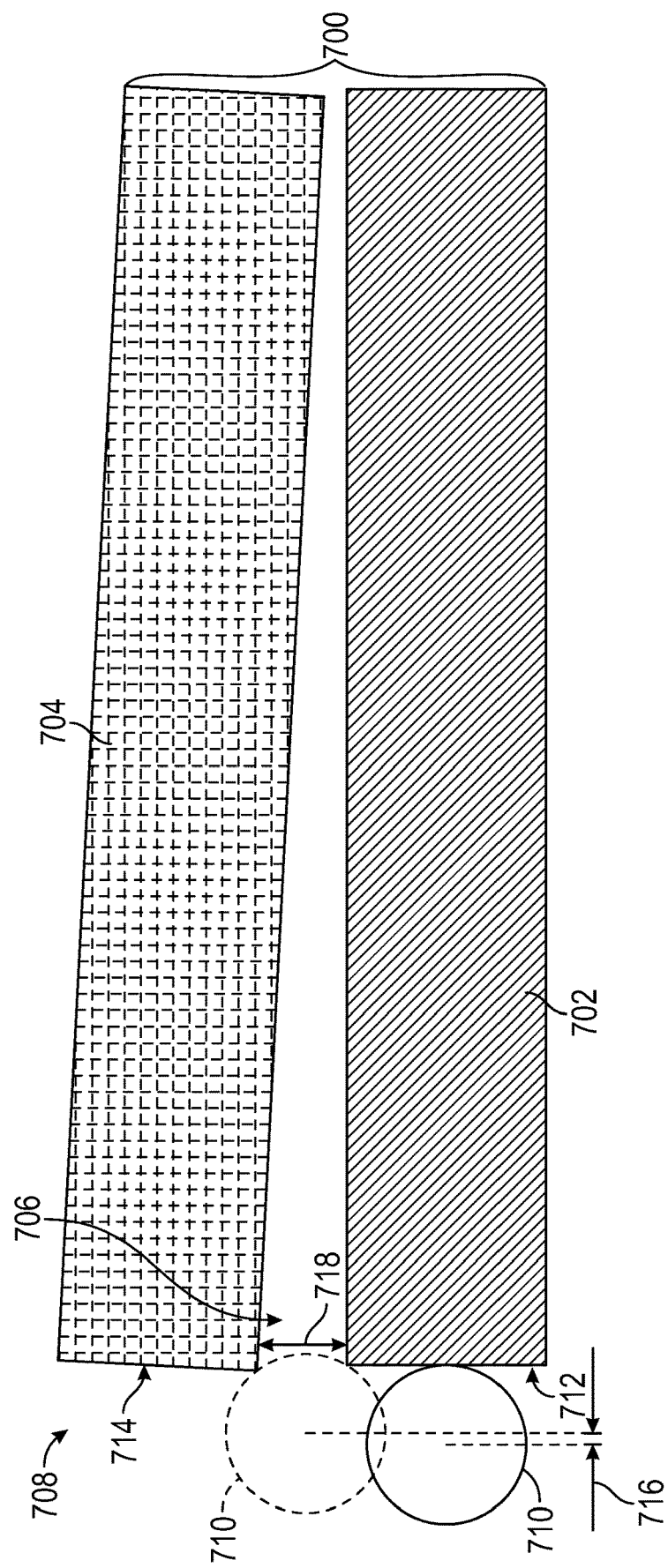
FIG. 7 is a schematic illustration of a portion of a structural component and probe tip measuring a gap of the structural component in accordance with an embodiment of the present disclosure.

For example, referring now to FIG. 7, as schematic illustration of a through-hole inspection process in accordance with an embodiment of the present disclosure. As shown in FIG. 7, a structural component 700 is formed from a first material layer 702 and as second material layer 704 separated by a gap 706. A portion of a through-hole 708 defined by the structural component 700 is shown.

To measure the dimension of the gap 706, a probe tip 710 is inserted into the through-hole 706. The probe tip 710 is placed in contact with a hole surface 712. In this illustrative embodiment, the hole surface 712 is shows as part of the first material layer 702. It will be appreciated that the probe tip 710 could be placed in contact with a hole surface 714 of the second material layer 704 to perform the same process described herein. The probe tip 710 is moved along the hole surface 712 and will pass over and potentially into the gap 706 (shown in dashed line version of probe tip 710). By monitoring the displacement 716 of the probe tip 710 as it transitions from the hole surface 712 into the gap 706, a measurement of the size of the gap 706 may be calculated. For example, by knowing a diameter of the probe tip 710 and the displacement 716, a gap size 718 may be calculated.

For example, in accordance with some embodiments of the present disclosure, the gap size 718 may be calculated based on the following relationship:

$$r^2 = (r-d)^2 + \left(\frac{1}{2}g\right)^2 \quad (1)$$

where r is the radius of the probe tip 710, d is the maximum displacement 716 of the probe tip 710 as it rests on both hole surfaces 712, 714, and g is the gap size 718. The maximum displacement 716 represents the maximum deflection of the probe tip 710 from the position of the probe tip 710 when it is in contact with the hole surface 712.

The probe tip 710 may be arranged at the end of a probe assembly that is mounted to or otherwise part of an AACMM system. As such, the displacement and deflections may be accurately measured without the need for human involvement. That is, the encoders of the AACMM and associated processing allow for highly accurate and repeatable measurements without direct human involvement.

The through-holes to be measured in accordance with some embodiments of the present disclosure may be relatively small. This small size of the through-holes and the nature of the orientation required to measure the gap between the material layers may require a relatively small probe tip. In some non-limiting embodiments, the probes and measuring process may be used for through-holes that have a diameter of four (4) inches or less. Additionally, the size of the probe tip may be of importance to ensure proper and accurate measurement. For example, if the probe tip is too small, it may fully fall into the gap without contacting the material layers and thus would not provide a measurement of the gap size. On the other hand, if the probe tip is too large, the gap size may be too small to appreciably impact a sliding motion of the probe tip along the through-hole surfaces, or if too large, the probe tip may not be able to fit within he through-hole itself. Accordingly, in accordance with some embodiments of the present disclosure, the probe tips may have a diameter of 10 mm or less, or 6 mm or less, or 2 mm or less.

For measuring through-holes having a diameter of about four inches and a maximum gap distance of 0.008 inch, a 2 mm diameter probe tip may provide sufficient accuracy and sensitivity. In such a configuration, the measurements may be accurate to 0.002 inch or better and repeatability of dimensions with such a 2 mm diameter probe tip may be within 0.0005 inch of a known gap separation distance (e.g., based on a known gauge block arranged between two material layers).

Figure 8:
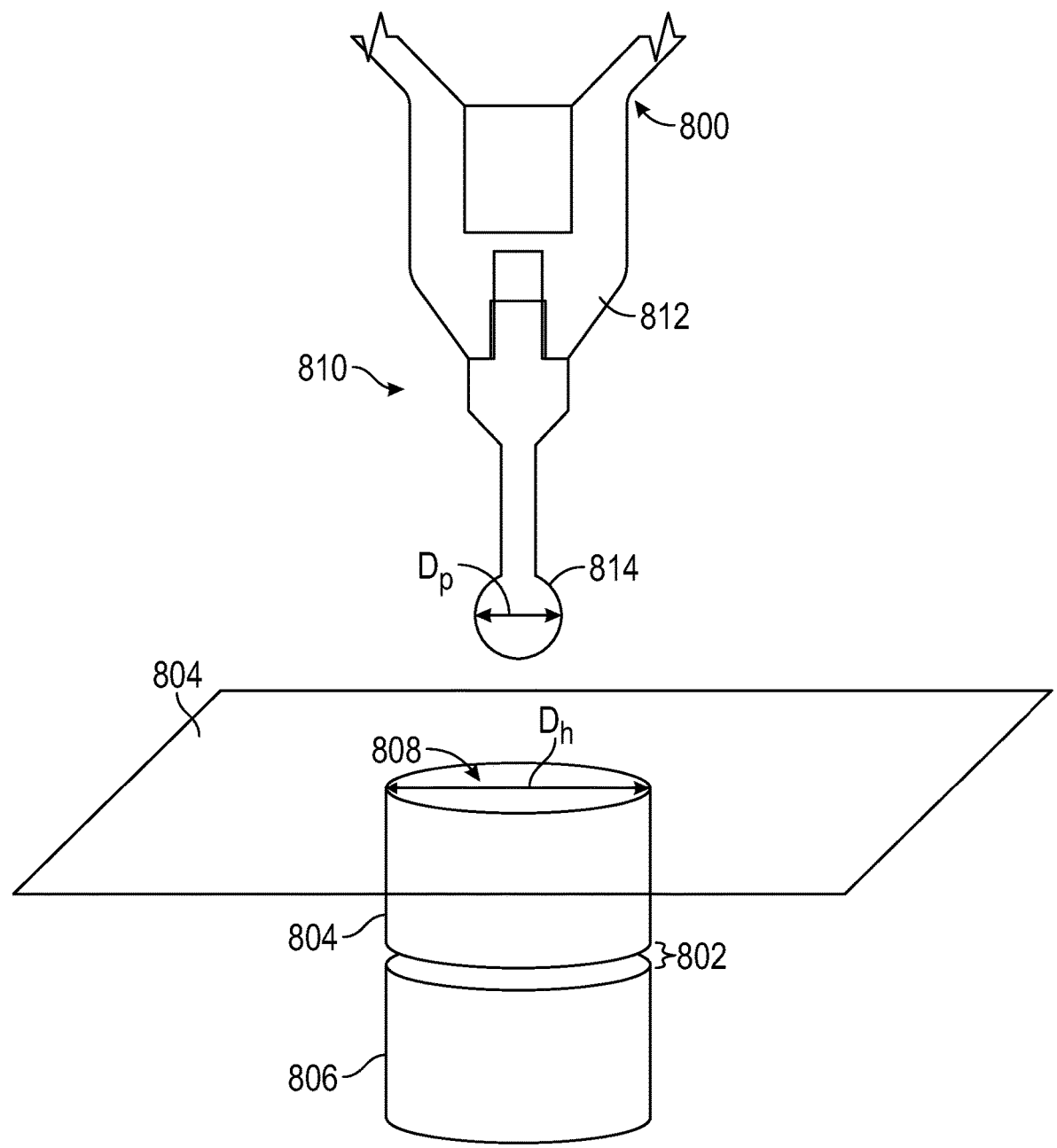
FIG. 8 is a schematic illustration of a measurement process in accordance with an embodiment of the present disclosure.

Referring to FIG. 8, a schematic illustration of a process of measuring a gap between two material layers in accordance with an embodiment of the present disclosure is shown. In FIG. 8, a probe system 800 is used to measure a gap 802 between a first material layer 804 and a second material layer 806 of a structural component. A through-hole 808 is formed in each of the first material layer 804 and the second material layer 806. The through-hole 808 has a hole diameter $D_h$. The probe system 800 may be part of an AACMM system with a probe assembly 810 having a probe body 812 with a probe tip 814 extending from the probe body 812. The probe tip 814 has a known tip diameter $D_p$.

During a measurement or inspection operation, the probe system 800 is arranged near the structural component, and the AACMM is activated to accurately measure the position of the probe tip 814. The probe tip 814 must have a tip diameter $D_p$ that is less than the hole diameter $D_h$ to allow for insertion of the probe tip 814 into the through-hole 808. The probe tip 814 is then placed in contact with a hole surface of the first material layer 804. The probe tip 814 is then translated along the hole surface of the first material layer 804 toward the second material layer 806. As the probe tip 804 travels along the hole surface of the first material layer 804 and transitions to contact with a hole surface of the second material layer 806, the probe tip 814 will traverse the gap 802. As the probe tip 814 traverses the gap 802, the probe tip 814 will deflect or displace into the gap 802 (if possible). This deflection of the probe tip 814 may be detected and measured through the measurement components of the AACMM, such as described above (e.g., encoders and the like).

Figure 9:
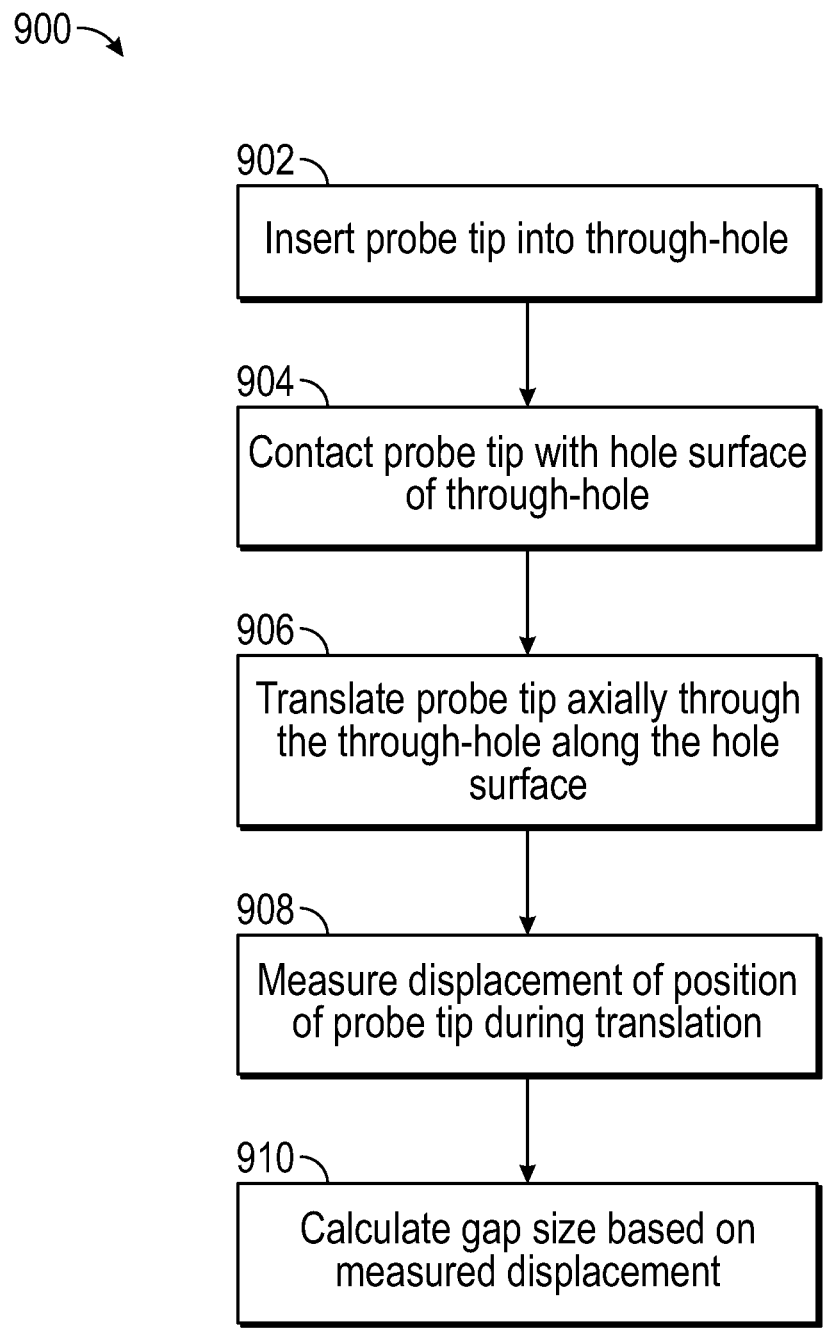
FIG. 9 is a flow process for measuring a gap of a structural component in accordance with an embodiment of the present disclosure.

Turning now to FIG. 9, a flow process 900 for measuring gaps between two layers of material. The flow process 900 may be performed using an AACMM having a probe tip on an end of the arm of the AACMM. The AACMM used for the process 900 may be similar to the systems shown and described above. The gaps to be measured by the AACMM system may be gaps between materials that are mated together and a through-hole is arranged to pass through each of the material layers. The through-holes may have a diameter that is four (4) inches or less and the probe tip may have a tip diameter that is 10 mm or less. In this example explanation the structural component to be measured will be described as formed of two material layers that are to be mated together by have a gap therebetween. However, it will be appreciated that measurement of gaps is not limited to two-layer components, and gaps between any two layers may be measured in accordance with embodiments of the present disclosure. For example, a structural component that is formed of three layers may have two gaps between the stack of layers, and the teachings of the present disclosure may be applicant to each gap to be measured. Further, although circular through-holes have been illustrated and described, this geometry is not to be limited, and through-holes of any geometry may be measured in accordance with embodiments of the present disclosure.

At block 902, the probe tip is inserted into the through-hole to be inspected. The probe tip may be controlled in position by an AACMM controller or the like. The AACMM may include onboard computing and processing components and/or may be operably connected to a remote terminal that provides such functionality. In some embodiments, the position of the probe may be manually controlled and measurement taken using such probe may be automated or substantially automated.

At block 904, with the probe tip positioned within the through-hole, the probe tip may be placed in contact with a surface of one of the material layers (e.g., a hole surface).

At block 906, the probe tip is then translated axially through the through-hole along the hole surface. The axial translation is in a direction from the first material layer (i.e., the one initially in contact with at block 904) toward the adjacent (second) material layer. As the probe tip is moved along the hole surface, it may adjust in a radial direction (i.e., relative to the axis through the through-hole). This radial displacement may occur as the probe tip passes over a gap between the first material layer and the second material layer.

At block 908, as the probe tip is being translated at block 906, the AACMM or other measurement system will measure the radial displacement of the probe tip. Because the AACMM provides for highly accurate position measurement and relatively position changes, the amount of displacement may be accurately measured. It is noted that the size (diameter) of the probe tip is known, and the displacement is being measured.

From the measured displacement, at block 908, in combination with the known size of the probe tip, the gap size can be calculated at block 910. The calculation may be based on equation (1) described above.

The process 900 may be repeated at various locations about the circumference of the through-hole and may also be applied to other through-holes on one or more structural components.

In some embodiments, the axial translation of the probe tip along the hole surface may be controlled to fully traverse the gap and continue traveling along a hole surface defined by the second material layer. As such, during traversal of the gap, the probe tip will travel at a first radial position along the first material layer, deflect or displace due to the gap, and then transition to a second radial position along the second material layer. In perfect conditions, the first and second radial positions will be the same and the only displacement is due to the deflection of the probe tip as it traverses the gap. Even in imperfect conditions, the first and second radial positions will typically be substantially similar and, at the least, typically less than the gap size and associated deflection of the probe tip as it traverses the gap.

When measuring the gaps described herein, the primary focus of such inspections, in accordance with some embodiments, may be to ensure that the gap does not exceed a predetermined threshold. That is, the absolute value of the size of the gap (or the lack of a gap entirely) may not be relevant to the inspection. Rather, the inspection may be made to ensure that all gaps are at a specific length or less, and an issue may be identified if the measured gap is greater than a maximum allowable gap size.

Advantageously, embodiments of the present disclosure provide for improved gap measurement that may provide for high precision and high repeatability, as compared to prior gap measurement methods. For example, prior inspection methods involved a human inspector using a manually operated set of 90° feeler gauges. This process has at least two drawbacks that are addressed by embodiments of the present disclosure. First, use of 90° feeler gauges relies on a human handling the tool and feeling as best as possible which size best fits (or doesn't fit) within a gap. As such, there is variability in the ability of the human operator in detecting the appropriate fit. Second, even with a single human inspector, repeatability of measurements may be very difficult to maintain, as each time the inspector measures a gap they will have a slightly different experience, and thus the accuracy between repeated measurements of the same gap may be low. In contrast, embodiments of the present disclosure provide both a high level of accuracy of the measurement of the gap along with high confidence levels in repeatability.

Although other high-precision measurements are possible, such as laser line probes and the like, these other types of measurement systems may not be viable for measuring gaps that are only accessible from a through-hole. Because through-holes may have a small diameter, the amount of room for access of measurement tools is limited. This is one of the reasons that 90° feeler gauges are employed. Such 90° feeler gauges may have a small profile to allow for insertion into the through-hole and then manipulation therein to position the 90° feeler gauge within the gap. That is, two sets of movement are required—a translation axial insertion and then a radial movement to place the gauge in the gap. Other types of probes are not sufficiently small or able to measure when angled relative to a surface (e.g., point a laser line probe at the gap would prevent the necessary reflection to obtain measurement of the gap). However, embodiments of the present disclosure provide for a small profile probe that relies on surface contact rather than insertion into the gap, and thus improved gap measurements are possible.

Figure 10A:
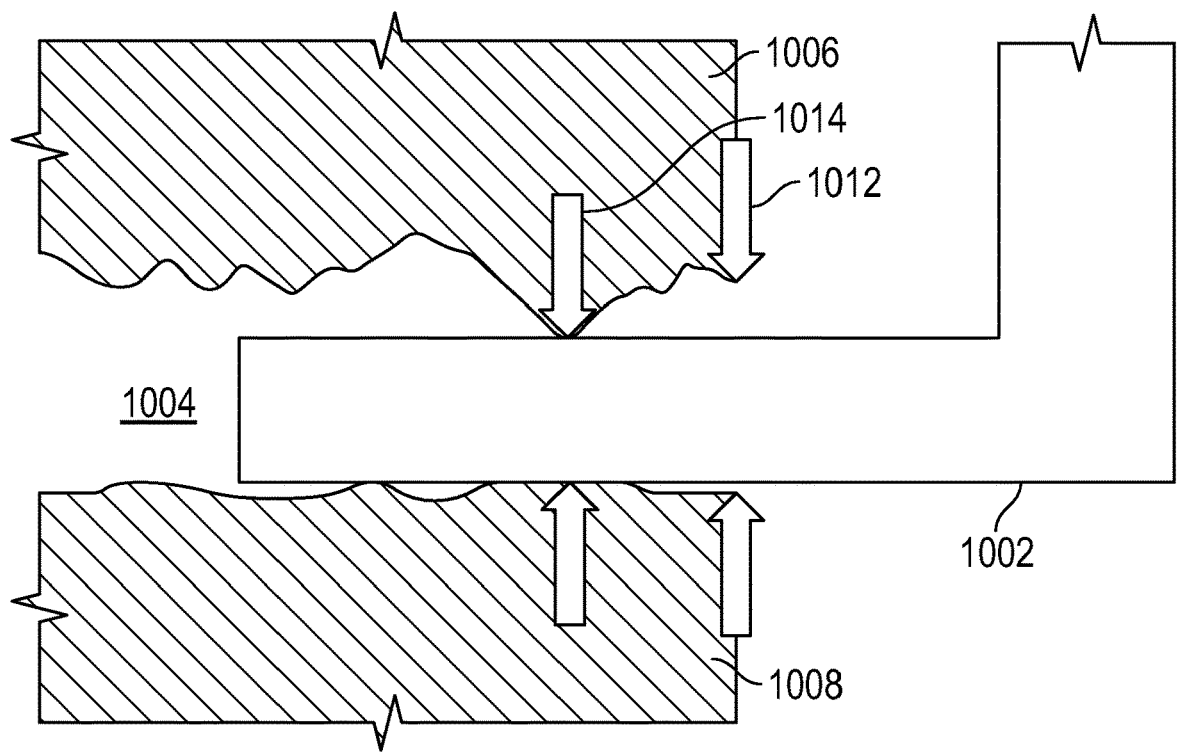
FIG. 10A is an illustrative depiction of measuring a gap between material layers using a feeler gauge.
Figure 10B:
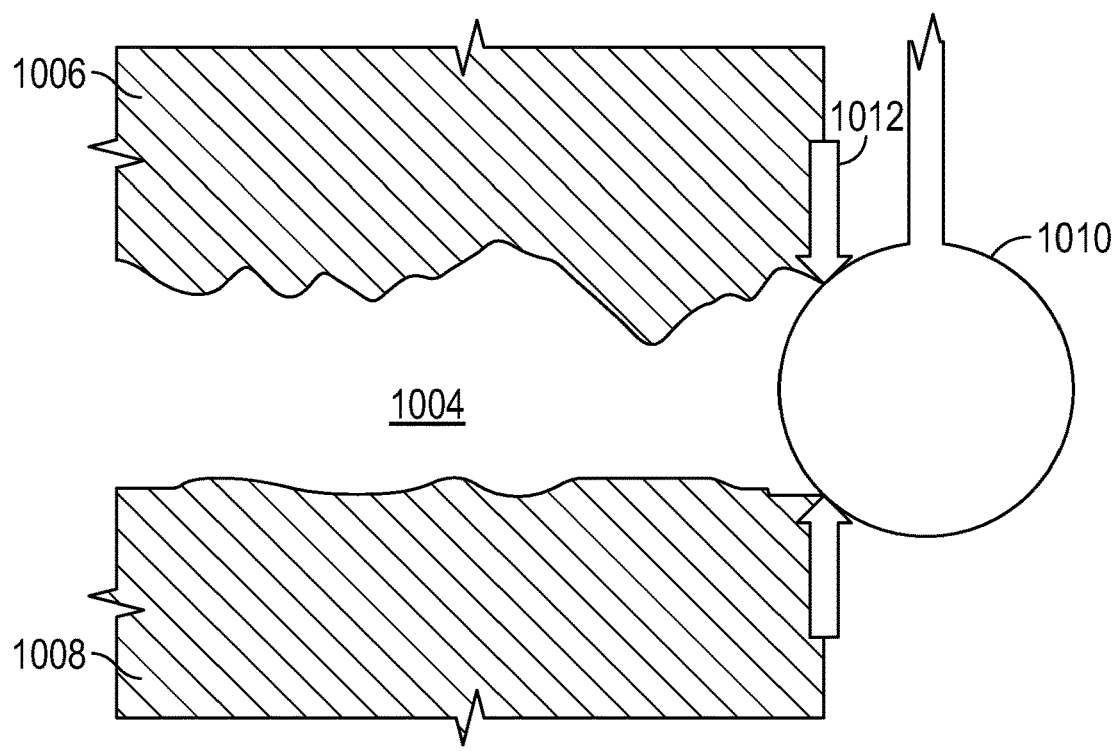
FIG. 10B is an illustrative depiction of measuring a gap between material layers using a probe tip in accordance with an embodiment of the present disclosure.

Referring now to FIGS. 10A-10B, schematic depictions of a comparison between measuring of a gap by a 90° feeler gauge (FIG. 10A) and a probe tip attached to an AACMM (FIG. 10B) in accordance with an embodiment of the present disclosure are shown. As shown in FIG. 10A, a feeler gauge 1002 is inserted into a gap 1004 to detect the minimum gap distance between a first material layer 1006 and a second material layer 1008. FIG. 10B illustrates a probe tip 1010 arranged to measure the same gap 1004 defined between the first material layer 1006 and the second material layer 1008.

As illustratively shown, the interior surfaces of the two material layers 1006, 1008, inward or away from an edge surface gap 1012 may not be smooth and thus can impact the ability to accurately measure the edge surface gap 1012. As shown in FIG. 10A, there may be a challenge of width and depth of the feeler gauge relative to the surfaces of the material layers 1006, 1008. Because the feeler gauge 1002 is a physical structure that is placed inside the gap 1004, it will always ride on the high points of the surfaces of the materials layers 1006, 1008 that define the gap 1004. As a result, measurements made using such feel gauges 1002 may be more likely to measure the gap 1004 as smaller than the edge surface gap 1012 of interest. As a result, as shown in FIG. 10A, the feeler gauge 1002 may result in an under report of the size of the gap 1004 with feeler gauge 1002 as shown in FIG. 10A, where the measured gap distance would be indicated as gap distance 1014 rather than the larger edge surface gap 1012. As a result, a human operator that is measuring to see if the gap is no larger than a maximum separation distance may improperly indicate that the gap 1004 is in compliance with requirements, when it in fact is not in compliance at the edge surface gap 1012. In contrast, as shown in FIG. 10B, the probe tip 1010 can accurately measure the edge surface gap 1012 and thus avoid false positive results or the like.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the embodiment(s) may include only some of the described aspects. Accordingly, the disclosure is not to be seen as limited by the foregoing description, but is only limited by the scope of the appended claims.

What is claimed is:

1. A method for measuring gaps, the method comprising:
   inserting a probe tip within a through-hole defined in a structural component, wherein the probe tip is arranged at the end of a probe assembly attached to articulated arm coordinate measuring machine (AACMM);
   contacting the probe tip with a hole surface of the through-hole;
   translating the probe tip along the hole surface in a direction parallel to an axis through the through-hole, wherein the probe tip passes over a gap along the through-hole;
   measuring a radial position of the probe tip during the translation along the hole surface and across the gap including a deflection of radial position of the probe tip as the probe tip crosses the gap; and
   calculating a gap size of the gap based on the deflection and a size of the probe tip.

2. The method of claim 1, wherein the structural component comprises a first material layer mated to a second material layer and the gap is defined between the first material layer and the second material layer.

3. The method of claim 2, wherein the through-hole is configured to receive a rivet to mechanically join the first material layer to the second material layer.

4. The method of claim 2, wherein the first material layer is formed of a material different from a material that forms the second material layer.

5. The method of claim 1, wherein the probe tip has a diameter of 10 mm or less.

6. The method of claim 5, wherein the probe tip has as diameter of 6 mm or less.

7. The method of claim 6, wherein the probe tip has a diameter of 2 mm or less.

8. The method of claim 1, wherein the through-hole has a diameter of 4 inches or less.

9. The method of claim 1, wherein the probe tip is a hard-probe tip.

10. The method of claim 1, wherein the gap size is calculated from a relationship:

$$r^2 = (r-d)^2 + \left(\frac{1}{2}g\right)^2,$$

where r is a radius of the probe tip, d is a maximum value of the measured deflection of the probe tip as it passes over the gap, and g is the gap size.

11. The method of claim 1, wherein the structural component is a part of a pressure bulkhead or a cargo door of aircraft or seacraft.

12. The method of claim 1, wherein the articulated arm coordinate measuring machine comprises a six-axis coordinate measuring machine.

13. The method of claim 1, wherein the articulated arm coordinate measuring machine comprises a seven-axis coordinate measuring machine.

14. The method of claim 1, wherein the articulated arm coordinate measuring machine comprises a first segment and a second segment joined at an elbow, and the probe assembly is attached to the second segment at a wrist.

15. The method of claim 13, wherein the first segment is connected to a base at a shoulder.

16. The method of claim 1, wherein the articulated arm coordinate measuring machine comprises a base housing electronics configured to perform the measurement of the position of the probe tip.

17. The method of claim 1, further comprising measuring the gap size of the gap at multiple different circumferential positions of the through-hole.

18. The method of claim 1, further comprising measuring a gap size of at least one second through-hole passing through the structural component.

* * * * *